(12) United States Patent
Yokoyama et al.

(10) Patent No.: US 8,867,824 B2
(45) Date of Patent: Oct. 21, 2014

(54) IMAGE PROCESSING APPARATUS, METHOD, AND PROGRAM

(75) Inventors: Kazuki Yokoyama, Kanagawa (JP); Takahiro Sakaguchi, Kanagawa (JP); Mayuko Maruyama, Tokyo (JP)

(73) Assignee: Sony Corporation, Tokyo (JP)

( * ) Notice: Subject to any disclaimer, the term of this patent is extended or adjusted under 35 U.S.C. 154(b) by 317 days.

(21) Appl. No.: 13/408,024

(22) Filed: Feb. 29, 2012

(65) Prior Publication Data

US 2012/0250979 A1    Oct. 4, 2012

(30) Foreign Application Priority Data

Mar. 29, 2011  (JP) ................. 2011-073042

(51) Int. Cl.
| G06K 9/00 | (2006.01) |
| G06T 5/00 | (2006.01) |
| H04N 13/02 | (2006.01) |
| G06T 7/00 | (2006.01) |
| H04N 13/00 | (2006.01) |

(52) U.S. Cl.
CPC ............ *G06T 5/008* (2013.01); *H04N 13/0271* (2013.01); *G06T 2207/10021* (2013.01); *G06T 2207/30201* (2013.01); *G06T 7/0075* (2013.01); *H04N 13/0022* (2013.01)
USPC ....................................... 382/154

(58) Field of Classification Search
None
See application file for complete search history.

(56) References Cited

U.S. PATENT DOCUMENTS

| 6,724,943 | B2 * | 4/2004 | Tsuchiya et al. ............... 382/261 |
| 6,954,202 | B2 * | 10/2005 | Han et al. ....................... 345/419 |
| 7,764,828 | B2 * | 7/2010 | Sasaki et al. ................... 382/154 |
| 2011/0261050 | A1 * | 10/2011 | Smolic et al. .................. 345/419 |
| 2014/0049617 | A1 * | 2/2014 | Kodaira et al. ................. 348/48 |

FOREIGN PATENT DOCUMENTS

JP    2001-298621    10/2001

* cited by examiner

*Primary Examiner* — Vikkram Bali
(74) *Attorney, Agent, or Firm* — Sherr & Jiang, PLLC

(57) ABSTRACT

An image processing apparatus includes a depth control signal generation unit generating a depth control signal controlling emphasis of the feel of each region of an input image based on the depth position of a subject in each region of the input image; a face skin region control signal generation unit generating a face skin region control signal controlling emphasis of the feel of each region in the input image based on the human face skin region in the input image; a person region control signal generation unit generating a person region control signal controlling emphasis of the feel of each region in the input image based on the region of the person in the input image; and a control signal synthesis unit synthesizing the depth control signal, the face skin region control signal, and the person region control signal to generate a control signal.

21 Claims, 18 Drawing Sheets

IMAGE PROCESSING APPARATUS, METHOD, AND PROGRAM

BACKGROUND

The present disclosure relates to an image processing apparatus, method, and program, in particular, to an image processing apparatus, method, and program capable of obtaining a more natural image without discomfort.

Hitherto, in order to obtain a higher quality image, image processing which performs adjustment of the feel with respect to an image has been used. For example, as such image processing, a process controlling the feel of a face region detected from the image and a process of preserving steep edge portions as is and emphasizing regions other than the edges have been proposed (for example, refer to Japanese Unexamined Patent Application Publication No. 2001-298621).

SUMMARY

However, in the above-described technique, there are times when a natural image without discomfort may not be obtained. For example, in image processing controlling the feel of the face region, since the feel of regions other than the face region is not controlled, the sharpness of the other regions may be overemphasized in comparison with the face region. In so doing, when capturing the scene of the image as a whole, in regard to human visual characteristics which focus on regions of high interest such as humans, the sense of depth is lost and the image has a sense of discomfort.

In particular, in display apparatuses displaying depth using parallax such as stereoscopic images (3D images), images created using enhancement or the like with respect to the parallax become unnatural and have an adverse influence on the sense of perspective recognized by the observer.

In addition, in the image process to emphasize the non-edge region, the contrast and sharpness of the image as a whole are emphasized; however, since the emphasis of the contrast and sharpness for each region such as the foreground and the background may not be controlled, there are cases where a sufficiently natural image may not be obtained.

It is desirable to obtain more natural images without discomfort.

The image processing apparatus of an embodiment of the present disclosure includes: a depth control signal generation unit generating a depth control signal controlling the degree of emphasis of the feel of each region of an input image based on the depth position of a subject in each region of the input image; a face skin region control signal generation unit generating a face skin region control signal controlling the degree of emphasis of the feel of each region in the input image based on the human face skin region in the input image; a person region control signal generation unit generating a person region control signal controlling the degree of emphasis of the feel of each region in the input image based on the region of the person in the input image; and a control signal synthesis unit synthesizing the depth control signal, the face skin region control signal, and the person region control signal to generate a control signal.

In the image processing apparatus, an image processing unit adjusting the feel of each region of the input image and generating an output image based on the control signal may be further provided.

In the image processing unit, it is possible to amplify or attenuate the edge components of the input image based on the control signal.

In the image processing unit, it is possible to amplify the texture component of the input image based on the control signal.

In the image processing unit, it is possible to amplify or attenuate the edge component of the input image based on a control signal other than the control signal.

In the image processing unit, it is possible to provide a prediction coefficient selection unit selecting a prediction coefficient used in the generation of the output image based on the control signal for each region of the output image, and a prediction calculation unit generating the output image with a higher resolution than the input image based on the input image and the prediction coefficient.

In the image processing unit, it is possible to amplify or attenuate the chroma component of the input image with respect to the control signal.

In the image processing apparatus, an interest region control signal generation unit generating an interest region control signal controlling the degree of emphasis of the feel of each region in the input image based on the region estimated to be of high interest in the input image is further provided, and the control signal synthesis unit may synthesize the depth control signal, the face skin region control signal, the person region control signal, and the interest region control signal to generate a control signal.

In the face skin region control signal generation unit, the human face skin region is specified and the face skin region control signal is generated based on the detection result of the human face region from the input image. In a case where the human face region is not detected from the input image of the process object, it is possible to specify the human face skin region in the input image of the process object based on the specific result of the human face skin region in a previous input image.

In the person region control signal generation unit, it is possible to specify the region of the person in the input image and generate the person region control signal using at least one of the detection result of the human face region from the input image or the specific result of the human face skin region of the input image.

The image processing method or program of one embodiment of the present disclosure includes: generating a depth control signal controlling the degree of emphasis of the feel of each region of the input image based on the depth position of a subject in each region of the input image; generating a face skin region control signal controlling the degree of emphasis of the feel of each region in the input image based on the human face skin region in the input image; generating a person region control signal controlling the degree of emphasis of the feel of each region in the input image based on the region of the person in the input image; and synthesizing the depth control signal, the face skin region control signal, and the person region control signal to generate a control signal.

In the embodiment of the present disclosure, a depth control signal is generated controlling the degree of emphasis of the feel of each region of the input image based on the depth position of the subject in each region of the input image, a face skin region control signal is generated controlling the degree of emphasis of the feel of each region of the input image based on the human face skin region in the input image, and a person region control signal is generated controlling the degree of emphasis of the feel of each region of the input image based on the person region in the input image; the depth control signal, the face skin region control signal, and the person region control signal are synthesized to generate a control signal.

According to the embodiment of the present disclosure, it is possible to obtain a more natural image without discomfort.

DETAILED DESCRIPTION OF EMBODIMENTS

Below, description will be given of embodiments to which the present disclosure is applied with reference to the drawings.

First Embodiment

Configuration Example of an Image Processing Apparatus

Figure 1:
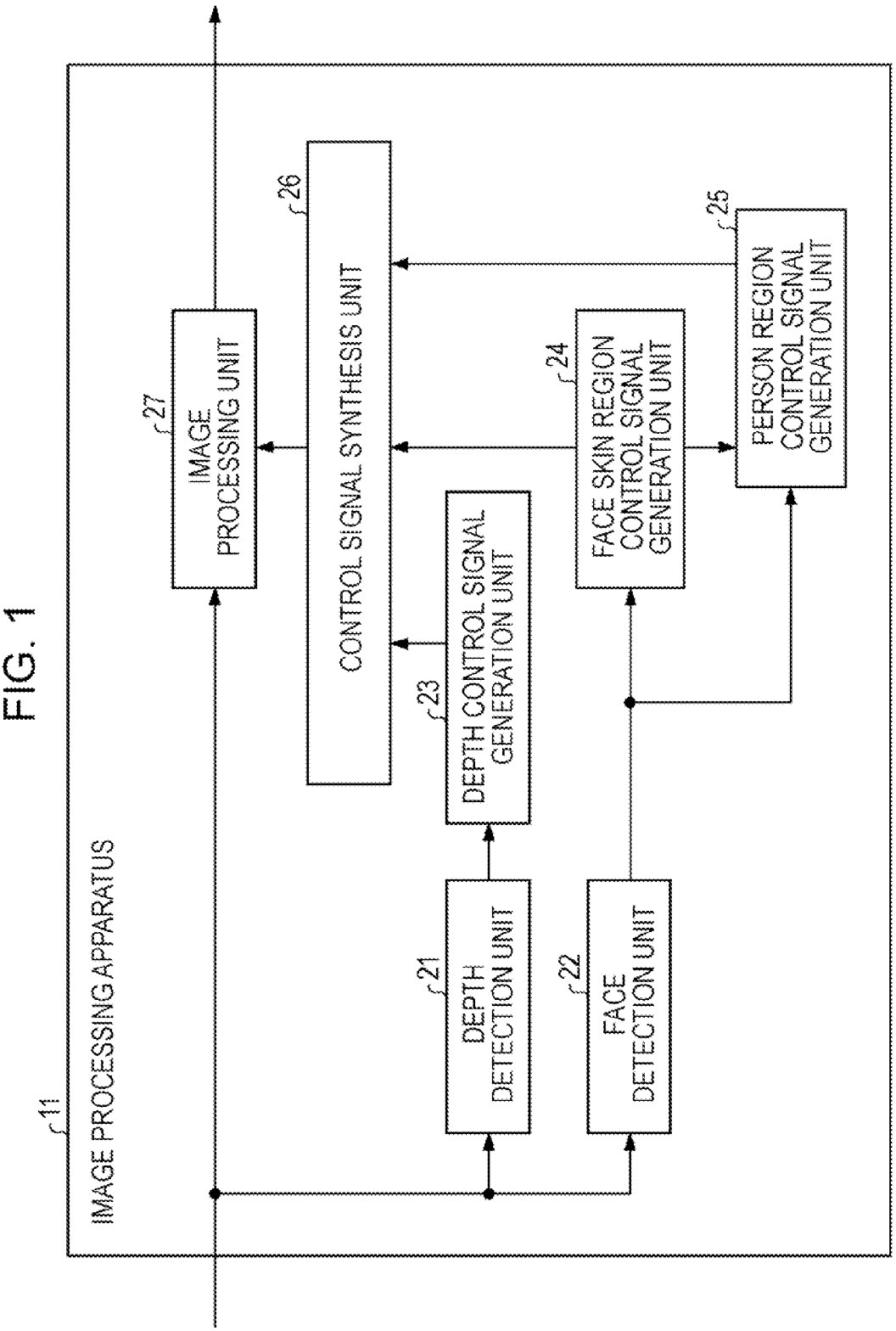
FIG. 1 is a diagram showing a configuration example of an embodiment of the image processing apparatus.

FIG. 1 is a diagram showing a configuration example of an embodiment of the image processing apparatus.

The image processing apparatus 11 performs image processing adjusting the feel of an input image with respect to an image signal of an input image and outputs the image signal obtained in such a manner. The input image may be a static image or may be a moving image.

The image processing apparatus 11 is configured of the depth detection unit 21, the face detection unit 22, the depth control signal generation unit 23, the face skin control signal generation unit 24, the person region control signal generation unit 25, the control signal synthesis unit 26, and the image processing unit 27.

The depth detection unit 12 generates depth information showing the depth position of each region (subject) on the input image based on the supplied input image, and performs supply thereof to the depth control signal generation unit 23. The face detection unit 22 detects a region of a face of a person on the input image based on the supplied input image and supplies the face detection information showing the detection result to the face skin region control signal generation unit 24 and the person region control signal generation unit 25. For example, the face detection information includes information specifying the face region on the input image such as the presence or absence of a face on the input image, the position of the face region on the input image, and the size of the face region.

The depth control signal generation unit 23 generates a depth control signal showing the degree of emphasis of the feel with respect to each region of the input image during the adjustment process of the feel performed with respect to the input image based on the depth information from the depth detection unit 21, and performs supply thereof to the control signal synthesis unit 26. Here, the depth control signal is for controlling the degree of emphasis of the feel for each of these regions according to the depth position of the subject in each region of the input image.

The face skin region control signal generation unit 24 generates a face skin map showing a human face skin region of the input image based on the face detection information supplied from the face detection unit 22 and performs supply thereof to the person region control signal generation unit 25. Further, during the adjustment process of the feel with respect to the input image, the face skin region control signal generation unit 24 generates a face skin region control signal showing the degree of emphasis of the feel with respect to each region of the input image based on the face skin map, and performs supply thereof to the control signal synthesis unit 26. Here, the face skin region control signal is for controlling the degree of emphasis of the feel for each of these regions according to the likelihood of each region of the input image being face skin.

The person region control signal generation unit 25 generates a person region control signal showing the degree of emphasis of the feel with respect to each region of the input image during the adjustment process of the feel with respect to the input image based on the face detection information from the face detection unit 22 and the face skin map from the face skin region control signal generation unit 24, and performs supply thereof to the control signal synthesis unit 26. Here, the person region control signal is for controlling the degree of emphasis of the feel for each of these regions according to the likelihood of each region of the input image being a person region.

The control signal synthesis unit 26 generates a control signal by synthesizing the depth control signal from the depth control signal generation unit 23, the face skin region control signal from the face skin control signal generation unit 24, and the person region control signal from the person region control signal generation unit 25, and performs supply thereof to the image processing unit 27.

The image processing unit 27 performs adjustment of the feel with respect to the supplied input image based on the control signal supplied from the control signal synthesis unit 26, and outputs the image obtained as a result (below, referred to as the output image). That is, according to the control signal, gain adjustment of each pixel of the input image is performed and set as an output image.

Here, for example, the process of adjusting the feel of the input image is one of adjusting the sharpness and contrast, the chroma, the degree of resolution creation, and the like.

[Configuration Example of the Image Processing Unit]

Figure 2:
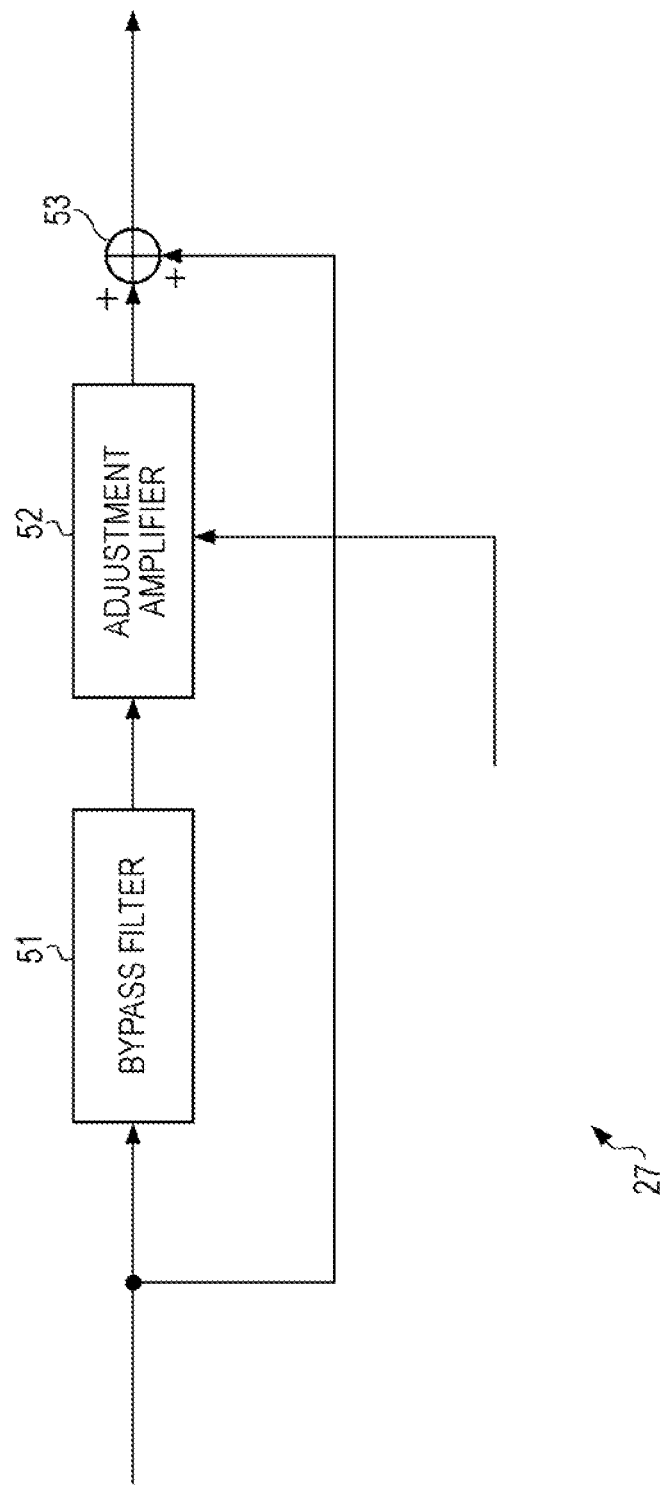
FIG. 2 is a diagram showing a configuration example of an image processing unit.

In addition, the image processing unit 27 of FIG. 1 is configured as shown in FIG. 2.

That is, the image processing unit 27 is configured of a high-pass filter 51, an adjustment amplifier 52, and an adder 53. The image processing unit 27 of FIG. 2 performs an enhancement process increasing the sharpness with respect to the input image as the adjustment process of the feel of the image.

The high-pass filter 51 performs a filter process using a high-pass filter with respect to the supplied input image and supplies the high-pass component (high-pass signal) obtained as a result to the adjustment amplifier 52.

The adjustment amplifier 52 amplifies or attenuates the high-pass component supplied from the high-pass filter 51 based on the control signal supplied from the control signal synthesis unit 26, and performs supply thereof to the adder 53. Below, the high-pass component amplified or attenuated by the adjustment amplifier 52 may also be called a corrected high-pass component.

The adder 53 adds the corrected high-pass component supplied from the adjustment amplifier 52 to the supplied input image and outputs the output image obtained as a result.

[Description of Image Processing]

Next, description will be given of the operation of the image processing apparatus 11.

When the image processing apparatus 11 is supplied with the input image and instructed to adjust the feel with, respect to the input image, the image process is performed, the input image is converted to an output image, and output. Below, description will be given of the image process using the image process apparatus 11 with reference to the flowchart of FIG. 3.

In step S11, the depth detection unit 21 generates depth information based on the supplied input image, and performs supply thereof to the depth control signal generation unit 23.

For example, the depth detection unit 21 extracts the high-pass component from the input image using a filter process or the like and divides the input image into several blocks. Then, the depth detection unit 21 generates depth information by calculating the sum (integrated value) of the absolute value of the value of the high-pass component in each position in the blocks for each block.

Generally, the inclusion of high-pass component becomes greater in the region in which the subject viewed (localized) from the front side by the user, that is, the foreground region, and the region in which the focus point is in focus on the image, and it is expected that the value of the depth information (integrated value of the high-pass component) corresponding to such regions will be increased. Therefore, it may be estimated that when the depth information value in the region on the input image is large, the (visible) subject region is further to the front side when viewed by a user observing the input image. In addition, regarding the estimation method of the depth position with respect to the image, for example, details are described in Japanese Unexamined Patent Application Publication No. 2007-208399.

In step S12, the face detection unit 22 detects a human face from the input image based on the supplied input image and generates the face detection information showing the detection result. The face detection unit 22 supplies the generated face detection information to the face skin region control signal generation unit 24 and the person region control signal generation unit 25.

In step S13, the depth control signal generation unit 23 generates a depth control signal based on the depth information supplied from the depth detection unit 21, and performs supply thereof to the control signal synthesis unit 26.

For example, the depth control signal generation unit 23 sets the image of the same size (resolution) as the input image and determines the pixel values of each pixel of the depth control image based on the depth information. For example, the greater the value of the depth information of the position corresponding to the pixels of the depth control image, the greater the pixel values of the pixels thereof. Further, the pixel values of the pixels of the depth control image may be set to have a negative value.

The depth control signal generation unit 23 sets the image signal of the depth control image obtained in such a manner as the depth control signal, and performs supply thereof to the control signal synthesis unit 26.

In this manner, when control is performed of the degree of emphasis of the sharpness of the input image using the depth control image (depth control signal) by determining the pixel values of each pixel of the depth control image according to the depth position of each subject of the input image, it is possible to obtain a more natural output image without discomfort. In other words, the sharpness of the subject in the front side is emphasized more than the subject in the far side of the input image, which is fitting with the human vision characteristic of seeing closer objects with greater sharpness, whereby it is possible to obtain a natural output image.

In step S14, the face skin region control signal generation unit 24 generates a face skin region control signal based on the face detection information supplied from the face detection unit 22, and performs supply thereof to the control signal synthesis unit 26.

For example, the face skin region control signal generation unit 24 acquires an input image from the face detection unit 22, and generates a pixel brightness histogram and a color histogram for a region likely to be a face based on the pixel values of each pixel of the region likely to be a human face on the input image indicated according to the face detection information. Here, the color histogram may be set as a two-dimensional UV histogram or the like, for example.

Next, the face skin control signal generation unit 24 sets the region made of pixels likely to be face skin on the input image as a human face skin region (face skin region) based on the generated brightness histogram and the color histogram, and generates a face skin map showing the face skin region on the input image.

More specifically, the face skin control signal generation unit 24, for example, sets a constant range in which the brightness value is as high as the brightness value range and the UV value range in the brightness histogram and the color histogram. Here, the face skin control signal generation unit 24 sets a pixel in which the brightness value is a value within the brightness value range and the UV value (color difference value) is a value within the UV value range in the pixels on the input image as the pixel likely to be face skin.

The face skin region control signal generation unit 24 supplies the generated face skin map to the person region control signal generation unit 25. For example, the pixel values of the pixels on the face skin map have a higher value as the likelihood that the pixels of the input image in the same position as those pixels are face skin region pixels increases. In this manner, it is possible to obtain a robust face skin map by estimating the face skin region using the brightness histogram and the color histogram.

In addition, the face skin region control signal generation unit 24 sets an image which is the same size as the input image as the face skin region control image, and determines the pixel values of each pixel of the face skin region control image based on the face skin map. For example, the pixel values of the pixels of the face skin region control image are set as values determined in advance with respect to the pixel values of the pixels of the face skin map at the same position as the pixels. The face skin region control signal generation unit 24 supplies an image signal of a face skin region control image obtained in this manner to the control signal synthesis unit 26 as a face skin region control signal.

Thus, when the degree of emphasis of the sharpness of the input image is controlled using the face skin region control signal by determining the pixel values of each pixel of the face skin region control image according to the likelihood that each region of the input image is a face, it is possible to obtain a more natural output image without discomfort. In other words, by appropriately emphasizing the sharpness of the region likely to be a face in the input image, it is possible to obtain a more natural output image.

Furthermore, when the input image is a moving image, instead of just the brightness histogram and the color histogram of the present frame of the input image, the brightness histogram and the color histogram determined with regard to the frame previous to the present frame may be used in the generation of the face skin map of the present frame.

In such a case, since it is possible to estimate the face skin region on the input image from the histograms of the previous frame and the present frame, it is possible to estimate the face skin region with higher precision without regard to the face detection precision in the face detection unit 22.

For example, when a person's face that was turned toward the front in the input image of a predetermined frame is turned to the side in the next frame, it may no longer be possible to detect the face from the input image in the face detection unit 22. Even in such a case, since the brightness and color of the face skin region may be understood from the brightness and color histograms of the previous (past) frame, when a region with the same color and brightness as the face skin region of the previous frame is detected as the face skin region in the input image of the present frame, it is possible to obtain a robust face skin map.

In step S15, the person region control signal generation unit 25 generates a person region control signal based on the face detection information from the face detection unit 22 and the face skin map from the face skin region control signal generation unit 24, and performs supply thereof to the control signal synthesis unit 26.

For example, the person region control signal generation unit 25 extends the region likely to be a person's face on the input image indicated by the face detection information and the region likely to be face skin on the input image indicated by the face skin map according to the shape characteristics off a human figure having the size of the head and shoulders of a human, and the extended region is set as a region likely to be a person. That is, a region of an outline of a person is estimated from the region likely to be a person and the region likely to be face skin. Thus, the person region control signal generation unit 25 generates a person region control image based on the likelihood of the person region in each region of the input image.

More specifically, when the input image is a static image, a person region control image using only the face detection information is generated, and, when the input image is a moving image, a person region control image is generated using both the face detection information and the face skin map, or just the face detection information.

For example, when the region which is likely to be a person's face and which is stably at approximately the same position is detected using the face detection information of successive frames, the region likely to be a person's face is extended using only the face detection information and set as the region likely to be a person.

Further, when the person region control image is generated using both the face detection information and the face skin map, for example, even when the face was not detected from the face detection unit 22, it is possible to detect the region likely to be a person with good precision from the robust face skin map.

The person region control signal generation unit 25 sets an image the same size as the input image as the person region control image and determines the pixel values of each pixel of the person region control image based on the likelihood that each region on the input image is a person. For example, regarding the pixel values of the pixels of the person region control image, when the same position as the pixels on the input image is a region which is likely to be a person, the pixel values are set as predetermined values determined in advance, and when the same position as the pixels on the input image is not a region which is likely to be a person, the pixel values are set as values smaller than the above-mentioned predetermined values.

Here, even in the region which is likely to be a person, the pixel values of the pixels of the person region control image may be set so as to be different values corresponding to the face region, the clothes region, and regions of parts of the person.

The person region control signal generation unit 25 supplies an image signal of a person region control image obtained in this manner to the control signal synthesis unit 26 as a person region control signal.

In this manner, when the degree of emphasis of the sharpness of the input image is controlled using the person region control signal by determining the pixel values of each pixel of the person region control image according to the likelihood of each region of the input image being a person region, it is possible to obtain a more natural output image without discomfort. That is, the sharpness of the region likely to be a person in the input image is emphasized to a greater extent than in other regions, which is fitting with the human vision characteristic of seeing objects of greater interest more sharply, whereby it is possible to obtain a natural output image.

In step S16, control signal synthesis unit 26 synthesizes the depth control signal from the depth control signal generation unit 23, the face skin region control signal from the face skin control signal generation unit 24, and the person region control signal from the person region control signal generation unit 25, and generates a control signal.

Figure 4:
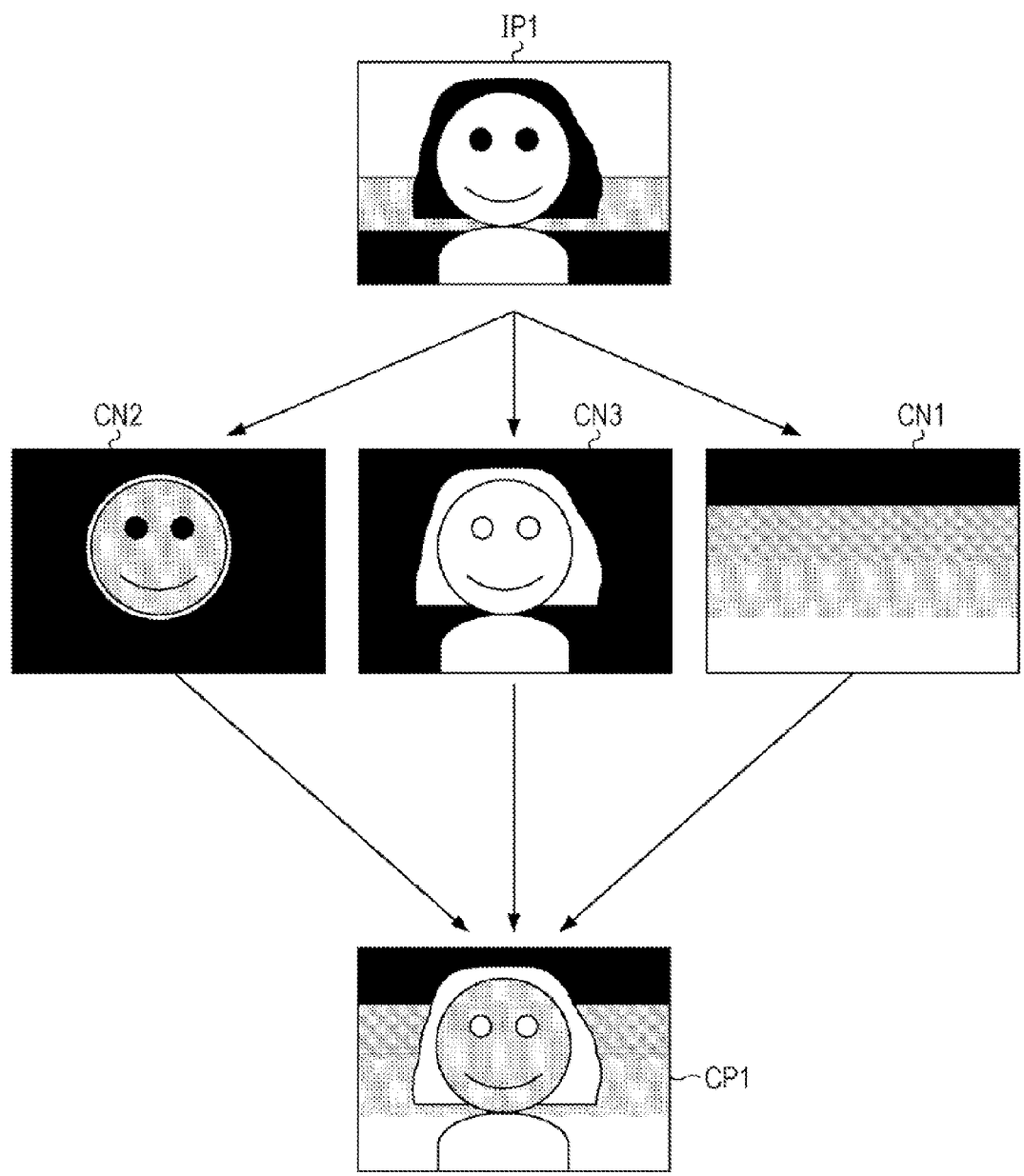
FIG. 4 is a diagram describing the generation of a control signal.

For example, as shown in FIG. 4, with respect to the input image IP1, a depth control image CN1, a face skin region control image CN2, and a person region control image CN3 are set to be obtained.

In the example in FIG. 4, in the input image IP1, a person is included, and in the depth control image CN1, the pixel values of the pixels are greater the lower the pixels are in the drawing. In other words, in the drawing of the input image IP1, the upper side is a distant view and the lower side is a close view in the drawing.

In addition, in the face skin region control image CN2, the pixel values of the pixels in the person face skin region are predetermined values according to the likelihood of being face skin, and the pixel values of the pixels of the other regions are zero. In addition, in the person region control image CN3, the pixel values of the pixels in the person region are predetermined values according to the likelihood of being a person region, and the pixel values of the pixels of the other regions are zero.

The control signal synthesis unit 26 weights and adds together the pixel values of the pixels in the same position as the depth control image CN1, the face skin region control image CN2, and the person region control image CN3, and sets the values obtained as a result as the pixel values of the pixels of the control image CP1. Next, the image signal of the control image CP1 obtained in this manner is set as the control signal.

For example, the weighting at the time of weighting and adding together the depth control image CN1, the face skin region control image CN2, and the person region control image CN3 is determined according to the priority set using the image process which is to be realized in the image processing unit 27. Specifically, when the sharpness of the input image IP1 is adjusted, each weighting is determined so that the weighting of the face skin region control image CN2 is maximized and the weighting of the depth control image CN1 is minimized.

In the image process corresponding to the input image IP1 which is performed by the image processing unit 27, in the regions in which the pixel values of the pixels of the control image CP1 are great, the sharpness is more strongly emphasized in the regions of the input image IP1 which are in the same position as those regions. Further, for example, when the pixels of the control image CP1 have negative values as pixel values, in the region of the input image IP1 in the same position as the pixels having negative pixel values, the image process is performed so as to reduce the sharpness.

Figure 5:
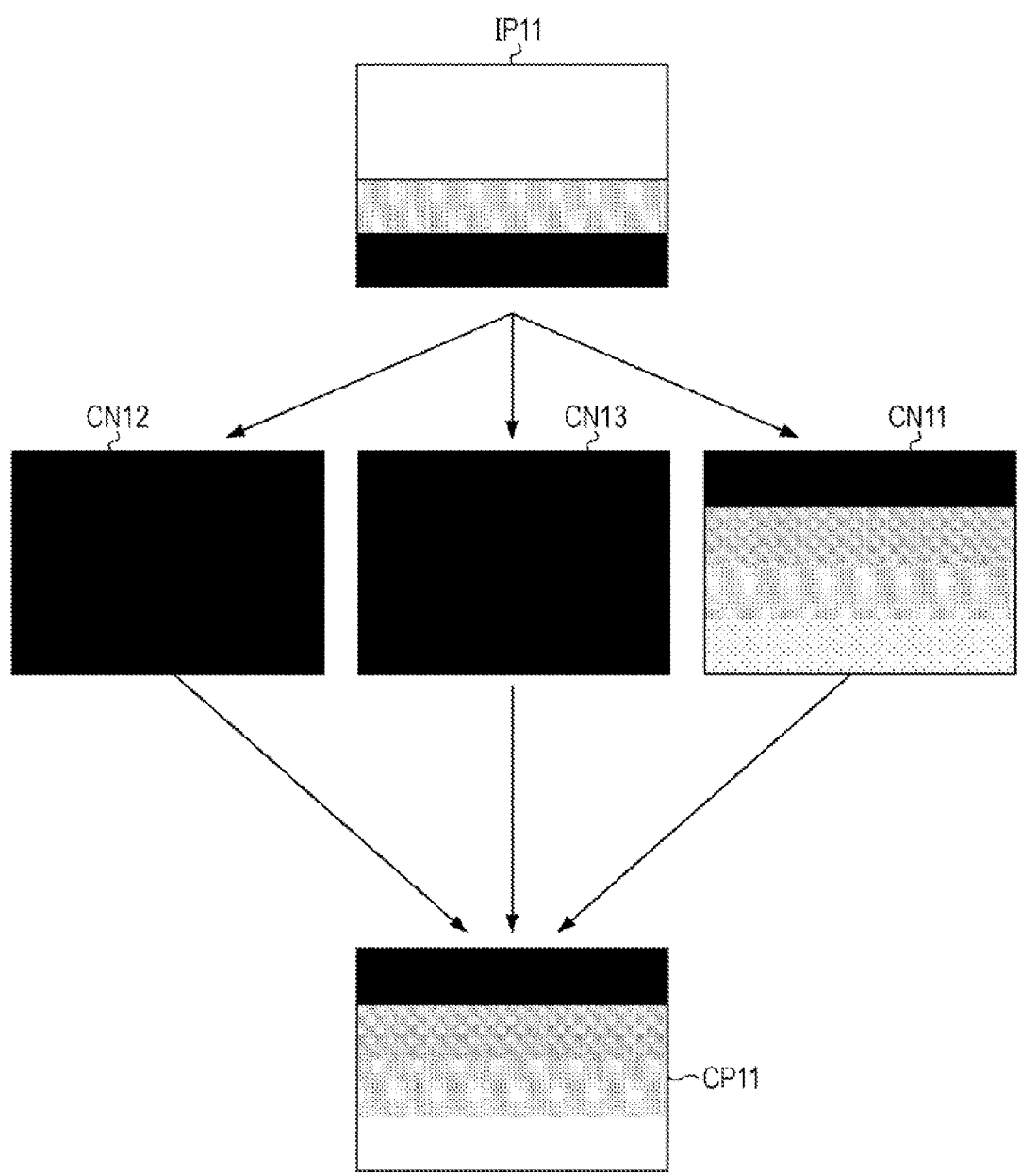
FIG. 5 is a diagram describing the generation of a control signal.

Also, as shown in FIG. 5, for example, when a person is not included in the input image IP11, after the depth control image CN11, face skin region control image CN12, and the person region control image CN13 are weighted and added together, appropriate gain adjustment is further performed and the control image CP11 is set.

In the example in FIG. 5, since a person is not included in the input image IP11, the pixel values of all the pixels of the face skin region control image CN12 and the person region control image CN13 are zero. Therefore, a control image CP11 is generated using substantially only the depth control image CN11.

In such a case, the obtainable range of the pixel values of the pixels of the depth control image CN11 is narrowed to the extent of the pixel values assigned to the face skin region control image CN12 and the person region control image CN13, and the sharpness of the input image IP11 may not be sufficiently emphasized.

Thus, when a person is not included in the input image IP11, after the depth control image CN11, to the person region control image CN13 are weighted and added together, appropriate gain adjustment is further performed and the control image CP11 is set. Specifically, among the pixels of the control image CP11, the pixels with a small pixel value are adjusted so that the pixel value becomes smaller and the pixels with a large pixel value are adjusted so that the pixel value becomes larger.

Further, whether or not a person is included in the input image IP11 is, for example, determined based on the pixel values of the pixels of the face skin region control image CN12 and the person region control image CN13. Specifically, for example, in a case where the pixel values of the pixels of all of the face skin region control image CN12 and the person region control image CN13 are a predetermined threshold or less, it is determined that a person is not included in the input image IP11.

In addition, for example, it is also possible to specify whether a person is included in the input image IP11 by the user selecting a portrait mode in which a person is included as a subject, a landscape mode in which a person is not included, or the like.

Figure 3:
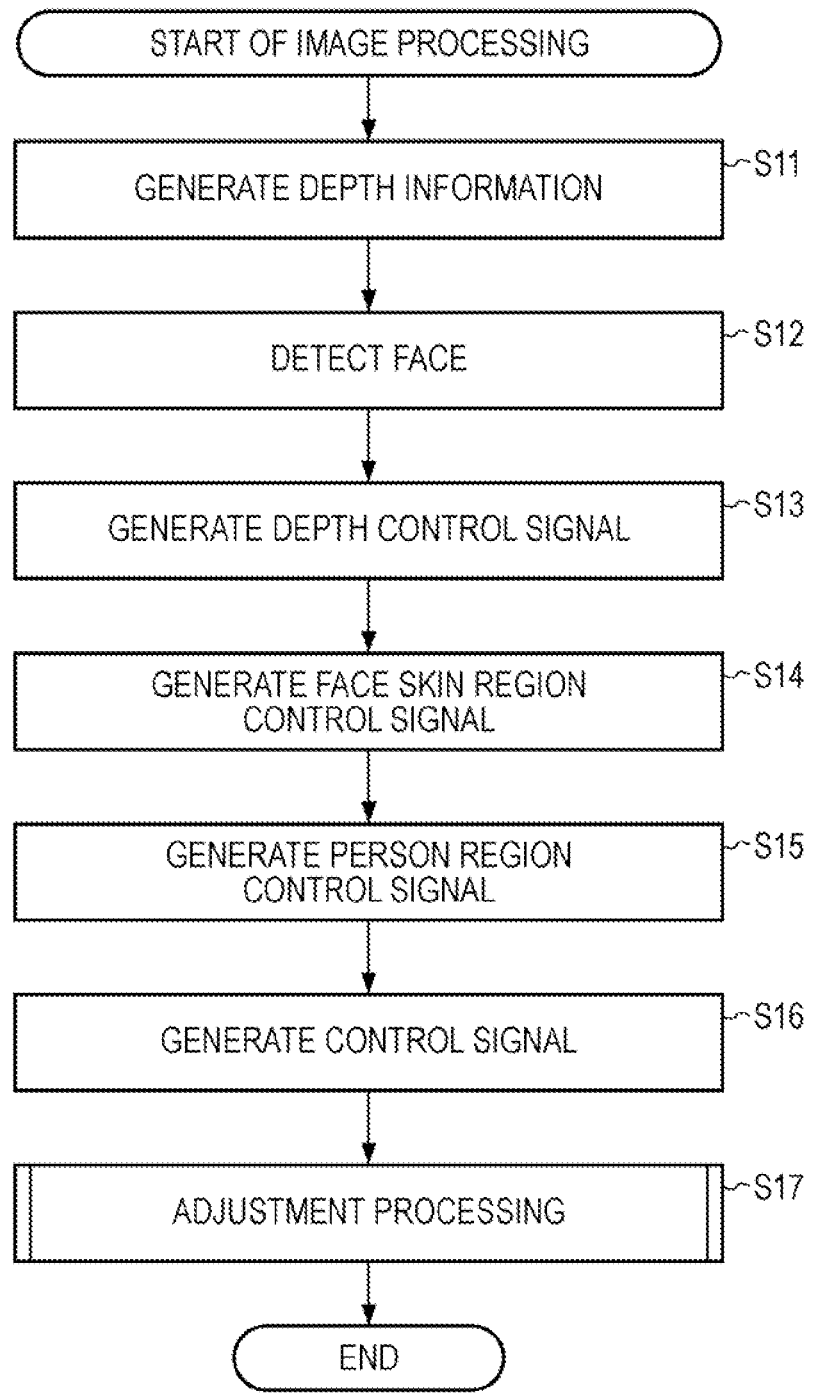
FIG. 3 is a flowchart describing an image process.

Returning to the description of the flowchart of FIG. 3, when the control signal synthesis unit 26 generates a control signal, the generated control signal is supplied to the image processing unit 27 and the process advances to step S17.

In step S17, the image processing unit 27 performs an adjustment process and generates an output image, which is then output. Here, the details of the adjustment process will be described later; however, in the adjustment process, the feel of the input image is adjusted based on the control signal supplied from the control signal synthesis unit 26 and an output image is generated. After the adjustment process is performed and the output image is generated, the image process is finished.

As described above, the image process apparatus 11 generates a depth control signal, a face skin region control signal, and a person region control signal from the depth information and the face detection information, and performs adjustment of the feel of the input image based on a control signal synthesizing these signals.

In this manner, by appropriately determining the degree of adjustment (degree of emphasis) of the feel for each region of the input image according to the depth of each subject, the face skin region, and the person outline region in the input image, it is possible to obtain a more natural output image without discomfort.

For example, in a case where the sharpness is adjusted as the feel adjustment, by sharpening the region of a person, which is generally of interest and creating a difference with the other regions while appropriately correcting the feel of the skin, it is possible to obtain a high quality output image close to the characteristics of human vision. Further, since the sharpness is controlled according to the laws of perspective even in a region in which a person is not detected, it is possible to obtain a high quality image with a sense of depth.

[Description of the Adjustment Process]

Figure 6:
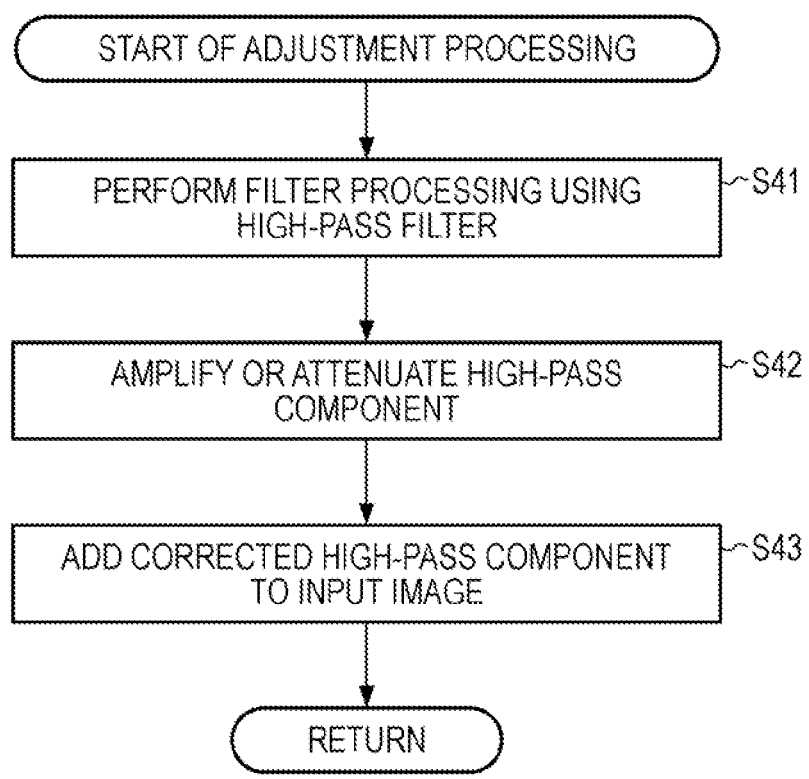
FIG. 6 is a flowchart describing an adjustment process.

Next, with reference to the flowchart in FIG. 6, description will be given regarding the adjustment process corresponding to the process of step S17 of FIG. 3. In the adjustment process, an enhancement process adjusting the sharpness of the input image is performed.

In step S41, a high-pass filter 51 performs a filter process using a high-pass filter with respect to the supplied input image, and extracts a high-pass component from the input image. The high-pass filter 51 supplies the high-pass component obtained using the filter process to the adjustment amplifier 52.

In step S42, the adjustment amplifier 52 amplifies or attenuates the high-pass component from the high-pass filter 51 for each region of the input image based on the control signal supplied from the control signal synthesis unit 26, and supplies the corrected high-pass component obtained as a result to the adder 53.

For example, the high-pass component is an image signal (high-pass signal) of an image in which only the high-pass component is extracted in the input image, and with respect to the pixel values of each pixel of this image, the pixel values of the pixels of the control image are added based on the control signal at the same position as these pixels, thereby setting a corrected high-pass component. Accordingly, when the pixel values of the pixels of the control image are positive, the high-pass component is amplified according to the size of the values, and when the pixel values of the pixels of the control image are negative, the high-pass component is attenuated according to the size of the values.

In step S43, the adder 53 adds the corrected high-pass component supplied from the adjustment amplifier 52 to the supplied input image, and outputs the output image obtained as a result. By adding the corrected high-pass component obtained by amplifying or attenuating the high-pass component for each region to the input image, the sharpness of each region of the input image is amplified or attenuated according to the characteristics of the region. In this manner, a high quality output image with a stereoscopic effect and for which the sharpness is adjusted for each region is obtained.

When the output image is output, the adjustment process is finished and, accordingly, when step S17 of FIG. 3 is also finished, the image process is finished.

As mentioned above, the image processing unit 27 performs adjustment of the sharpness of each region by amplifying or attenuating the high-pass component of the input image based on the control signal. When the control signal is used, it is possible to adjust the sharpness for each region and sharpness control with a preferable stereoscopic effect is possible. Accordingly, for example, it is possible to perform appropriate adjustment of the feel for each region in optimal image processing with respect to skin corresponding to a person who is of great interest and other parts, and in image processing having depth such as landscape. As a result, it is possible to adaptively express a natural sense of depth close to the human vision characteristic with respect to scenes of individual images.

<Modification 1>

[Configuration Example of an Image Processing Apparatus]

Here, the input image is not limited to being a two-dimensional planar image and may be a stereoscopic image made of a left eye image and a right eye image. Here, the left eye image is an image displayed so as to be observed with the user's left eye during observation of the stereoscopic image and the right eye image is an image displayed so as to be observed with the user's right eye during observation of the stereoscopic image.

Figure 7:
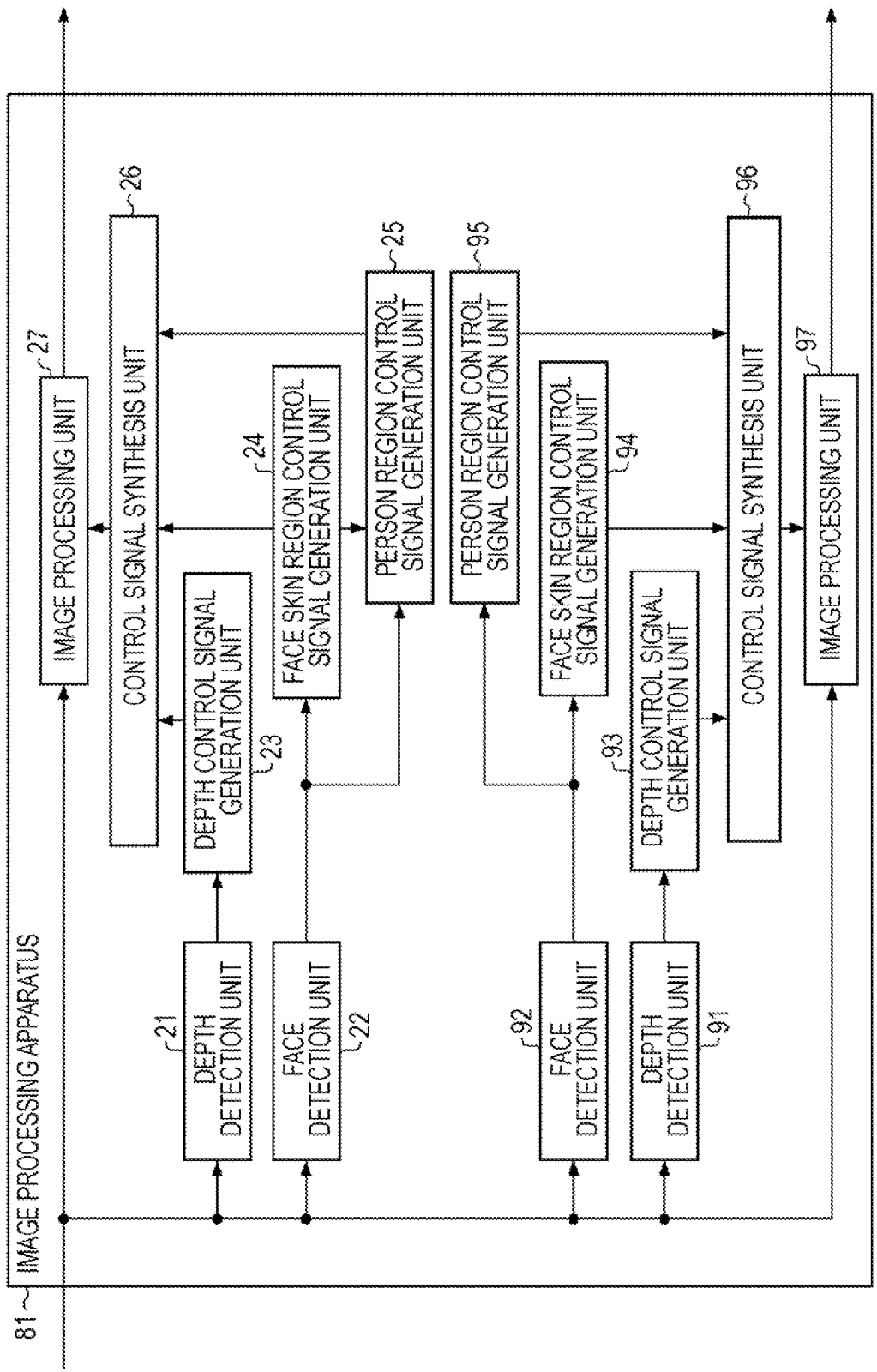
FIG. 7 is a diagram showing another configuration example of an image processing apparatus.

When the input image is a stereoscopic image, the image processing apparatus, for example, is configured as shown in FIG. 7. In addition, in FIG. 7, the portions corresponding to the case in FIG. 1 have the same reference numerals, and description thereof will be omitted.

The image processing apparatus 81 of FIG. 7 is configured of a depth detection unit 21, a face detection unit 22, a depth control signal generation unit 23, a face skin region control signal generation unit 24, a person region control signal generation unit 25, a control signal synthesis unit 26, an image processing unit 27, a depth detection unit 91, a face detection unit 92, a depth control signal generation unit 93, a face skin region control signal generation unit 94, a person region control signal generation unit 95, a control signal synthesis unit 96, and an image processing unit 97.

That is, the image processing apparatus 81 is configured so that the image process apparatus 11 is further provided with the depth detection unit 91 to the image processing unit 97. Further, in the image process apparatus 81, as the input image, a stereoscopic image is supplied to the depth detection unit 21, the face detection unit 22, the image processing unit 27, the depth detection unit 91, the face detection unit 92 and the image processing unit 97.

Here, the units from depth detection unit 91 to the image processing unit 97 perform the same processes as the units from depth detection unit 21 to the image processing unit 27. However, in the depth detection unit 21 to the image processing unit 27, processing is performed with respect to the left eye image, whereas in the depth detection unit 91 to the image processing unit 97, processing is performed with respect to the right eye image.

Further, for example, in the depth detection unit 21 and the depth detection unit 91, parallax is detected between the left eye image and the right, eye image according to stereo matching or the like based on the stereoscopic image, and depth information is generated based on the detection result. Specifically, for example, in the depth detection unit 21, in regard to each pixel of a left eye image, pixels of a right eye image corresponding thereto are detected, and parallax is calculated for each pixel from the distance between respective pixels. Similarly, in the depth detection unit 91, in regard to each pixel of the right eye image, the pixels of the left eye image corresponding thereto are detected, and parallax is calculated for each pixel.

Accordingly, even if the input image is a stereoscopic image, it is possible to appropriately adjust the feel of the stereoscopic image for each region. In particular, in a stereoscopic image, the control of the feel adjustment is accurately controlled for each region according to the depth information, and it is possible to express a preferable stereoscopic effect.

Second Embodiment

Configuration Example of an Image Processing Apparatus

Further, in the above, description was given of an example of detecting a person region in order to adjust the feel of a region of high interest; however, in general, other regions of high interest may be detected and feel adjustment performed with respect to those regions.

Figure 8:
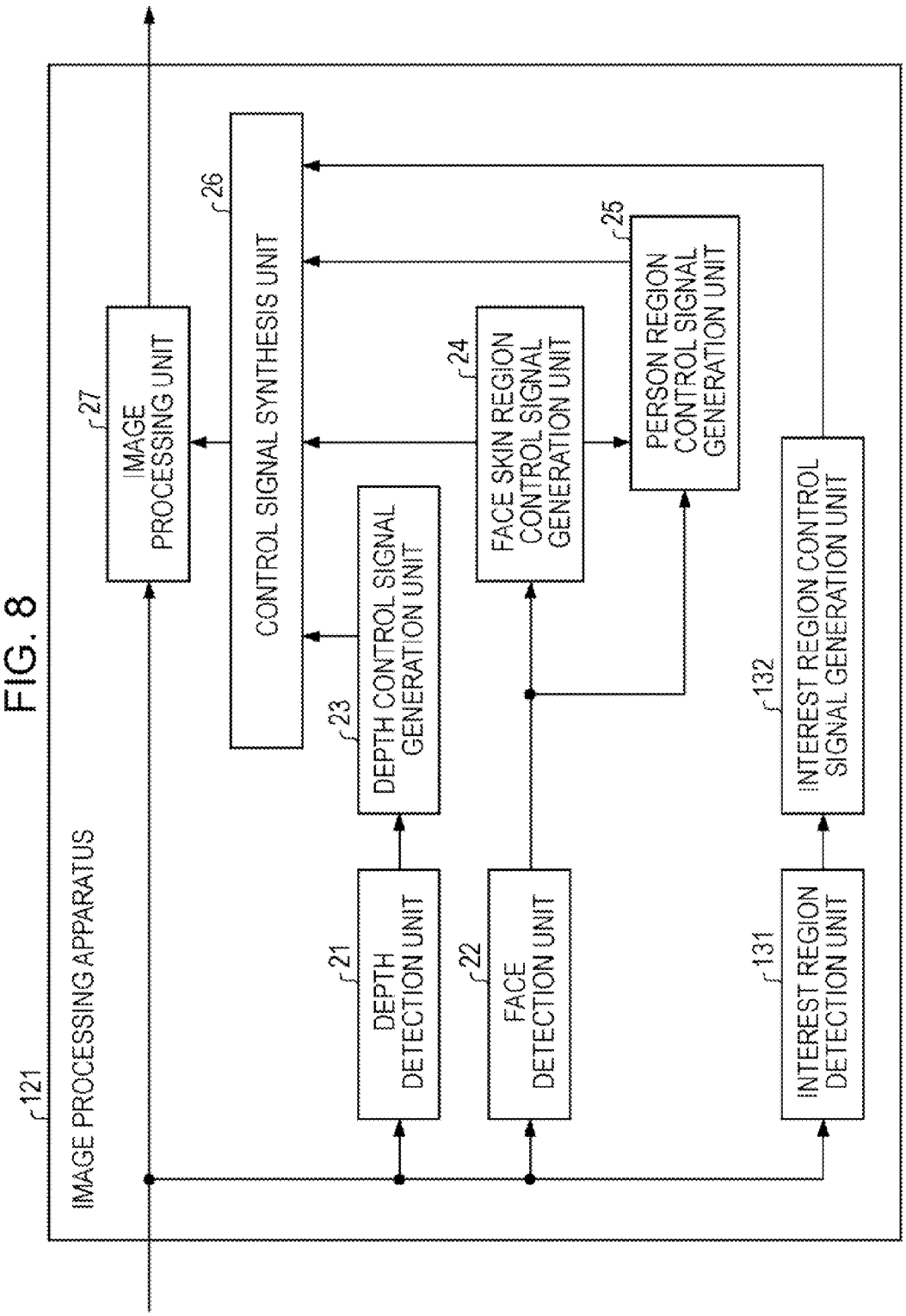
FIG. 8 is a diagram showing another configuration example of an image processing apparatus.

In such a case, the image processing apparatus is configured as shown in FIG. 8, for example. In addition, iv, FIG. 8, the portions corresponding to the case in FIG. 1 have the same reference numerals, and description thereof will be omitted.

The image processing apparatus 121 of FIG. 8 is configured of a depth detection unit 21, a face detection unit 22, a depth control signal generation unit 23, a face skin region control signal generation unit 24, a person region control signal generation unit 25, a control signal synthesis unit 26, an image processing unit 27, an interest region detection unit 131, and an interest region control signal generation unit 132.

The interest region detection unit 131 detects regions estimated as generally being the focus of users from the supplied input image (below referred to as interest regions), and supplies interest region information showing the detection result to the interest region control signal generation unit 132.

The interest region control signal generation unit 132 generates an interest region control signal showing the degree of emphasis of the feel corresponding to each region of the input image during the adjustment process of the feel corresponding to the input image based on the interest region information supplied from the interest region detection unit 131, and performs supply thereof to the control signal synthesis unit 26. Here, the interest region control signal is a signal for controlling the degree of emphasis of the feel for each region according to the likelihood that each region is an interest region, that is, according to the level of interest.

The control signal synthesis unit 26 synthesizes the depth control signal from the depth control signal generation unit 23, the face skin region control signal from the face skin control signal generation unit 24, the person region control signal from the person region control signal generation unit 25, and the interest region control signal from the interest region control signal generation unit 132, and generates a control signal. The control signal synthesis unit 26 supplies the generated control signal to the image processing unit 27.

[Description of Image Process]

Figure 9:
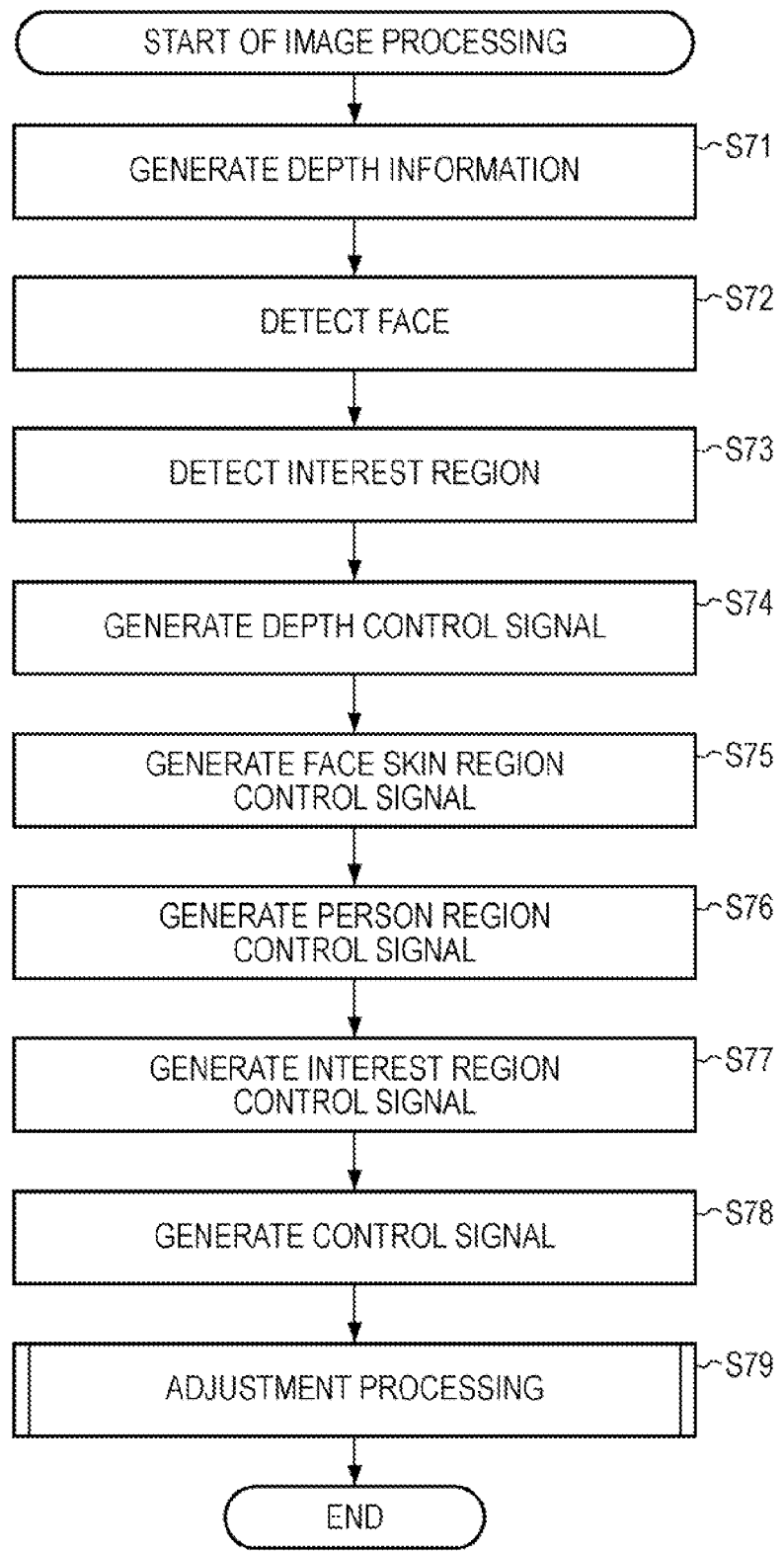
FIG. 9 is a flowchart describing an image process.

Next, with reference to the flowchart in FIG. 9, description will be given of the image process performed by the image processing apparatus 121. Here, since the processes of step S71 and step S72 are the same as the processes of step S11 and step S12 of FIG. 3, description thereof will be omitted.

In step S73, the interest region detection unit 131 detects an interest region from the supplied input image, and supplies the interest region information to the interest region control signal generation unit 132.

For example, when the input image is a moving image, the interest region detection unit 131 detects the movement vector of each region of the input image using the input image of the present frame of the process target and the input image of the previous frame (below, referred to as the local movement vector). In addition, the interest region detection unit 131 calculates the movement vector of the background of the input image as the global movement vector based on the input image. For example, the global movement vector is set as the average value of the movement vectors of the left and right edge regions of the input image, or the like.

Furthermore, the interest region detection unit 131 calculates the difference between the global movement vector and the local movement vector for each region of the input image, and calculates the degree of interest showing the degree of likelihood that each region is an interest region. The degree of interest shows the extent to which a user's eyes are drawn to the regions on the input image, in other words, the extent of the level of interest.

The interest region detection unit 131 detects interest regions on the input image based on the degree of interest of each region of the input image, and the camerawork such as the panning, tilting, and zooming at the time of image capture of the input image, and supplies the interest region information showing the interest regions to the interest region control signal generation unit 132. Here, regarding the detection of the interest regions, for example, detailed description may be found in Japanese Unexamined Patent Application Publication No. 2008-53775 and the like.

After an interest region is detected, the processes from step S74 to step S76 are performed; however, since these processes are the same as those from step S13 to step S15 of FIG. 3, description thereof will be omitted.

In step S77, the interest region control signal generation unit 132 generates an interest region control signal based on the interest region information supplied from the interest region detection unit 131, and performs supply thereof to the control signal synthesis unit 26.

For example, the interest region control signal generation unit 132 sets an image of the same size as the input image as the interest region control image, and calculates the pixel values of each pixel of the interest region control image based on the interest region information. For example, the pixel values of the pixels of the interest region control image in the same position as the interest region on the input image are set as large values, and the pixel values of the pixels of the interest region control image in the same position as the regions which are not interest regions on the input image are set as small values.

In this manner, when the degree of emphasis of the sharpness of the input image is controlled using the interest region control image (interest region control signal) by determining the pixel values of each pixel of the interest region control image according to the position of the interest region of the input image, it is possible to obtain a more natural output image without discomfort. In other words, the sharpness of the region of high interest is further emphasized, whereby it is possible to obtain a natural output image fitting the human vision characteristic that objects which are closely observed appear more sharply.

The interest region control signal generation unit 132 supplies the image signal of the interest region control image obtained in this manner to the control signal synthesis unit 26 as an interest region control signal.

In step S78, the control signal synthesis unit 26 synthesizes the depth control signal from the depth control signal generation unit 23, the face skin region control signal from the face skin control signal generation unit 24, the person region control signal from the person region control signal generation unit 25, and the interest region control signal from the interest region control signal generation unit 132, and generates a control signal. Then, the control signal synthesis unit 26 supplies the generated control signal to the image processing unit 27.

After a control signal is generated, the process of step S79 is performed and the image process is finished; however, since the process of step S79 is the same as the process of step S17 of FIG. 3, description thereof will be omitted.

As described above, by appropriately determining the degree of adjustment of the feel for each region of the input image according to the depth of each subject in the input image, the face skin region, and the person outline region, it is possible to obtain a more natural output image without discomfort. In particular, by determining the degree of adjustment of the feel according to the interest region, even in a case where a subject of high interest other than a person is present in the input image, a preferable image display suited to human vision characteristics is possible.

Third Embodiment

Configuration Example of an Image Processing Unit

Above, in the image processing unit 27, description was given regarding a case where sharpness adjustment is performed as adjustment of the feel of the input image; however, it is also possible to adjust the contrast as well as the sharpness.

Figure 10:
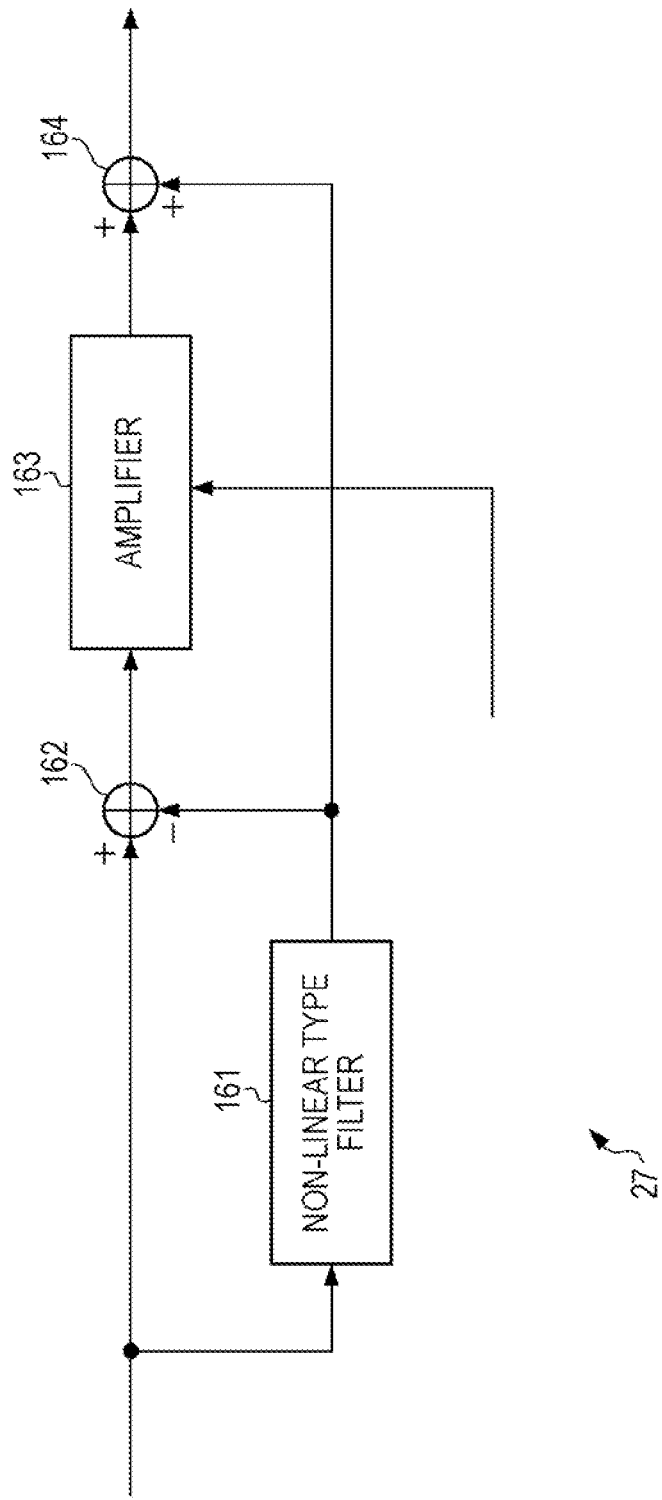
FIG. 10 is a diagram showing a configuration example of an image processing unit.

In such a case, the image processing unit 27 of FIG. 1 is configured as shown in FIG. 10, for example. That is, the image processing unit 27 is configured of the non-linear type filter 161, the subtraction unit 162, the amplifier 163 and the adder 164. In the image processing unit 27, sharpness and contrast adjustment is performed with respect to the input image, and an output image is generated.

The non-linear type filter 161 performs a filter process using a non-linear type filter made of an ε filter or the like with respect to a supplied input image, and supplies the image obtained as a result (below referred to as a smoothed image) to the subtraction unit 162 and the adder 164. Here, the non-linear type filter smoothes the entire input image with the portion in which the pixel values of the input image change steeply, that is, the edge portion, is preserved as is.

The subtraction unit 162 subtracts the smoothed image from the non-linear type filter 161, and supplies the texture component obtained as a result to the amplifier 163. The amplifier 163 amplifies the texture component supplied from the subtraction unit 162 for each region of the input image based on the control signal supplied from the control signal synthesis unit 26, and performs supply thereof to the adder 164. Below, the texture component of the input image amplified by the amplifier 163 is appropriately referred to as the corrected texture component.

The adder 164 adds the corrected texture component supplied from the amplifier 163 to the smoothed image supplied from the non-linear type filter 161 and outputs the output image obtained as a result.

[Description of the Adjustment Process]

Incidentally, even in a case where the image process unit 27 is configured as shown in FIG. 10, the image process described with reference to FIG. 3 is performed by the image processing apparatus 11. Further, in the adjustment process of step S17 in the image process, adjustment of the sharpness and contrast of the input image is performed.

Below, with reference to the flowchart in FIG. 11, description is given with respect to the adjustment process performed by the image processing unit 27 of FIG. 10. The adjustment process corresponds to step S17 of FIG. 3.

In step S101, the non-linear type filter 161 performs a filter process using a non-linear type filter with respect to the supplied input image, and supplies the smoothed image obtained as a result to the subtraction unit 162 and the adder 164.

In the filter process, the entire input image is smoothed with the edge portions of the input image preserved as is. During the filter process, when the tap length of the non-linear filter is lengthened, the low-pass amplitude component is included in the texture component and the corrected texture component. The detailed description of the filter process may be found in Japanese Unexamined Patent Application Publication No. 2001-298621, for example.

In step S102, the subtraction unit 162 subtracts the smoothed image from the non-linear type filter 161 from the supplied input image, and extracts a texture component from the input image. Here, the texture component is obtained by leaving out the component including the edge from the input image. The subtraction unit 152 supplies the obtained texture component to the amplifier 163.

In step S103, the amplifier 163 amplifies the texture component supplied from the subtraction unit 162 for each region of the input image based on the control signal supplied from the control signal synthesis unit 26, and supplies the corrected texture component obtained as a result to the adder 164.

For example, the texture component is an image signal of the image obtained by leaving out the component including the edge from the input image. With respect to the pixel values of each pixel of the image, the texture component is set as the corrected texture component by adding the pixel values of the pixels of the control image in the same position as the pixels.

In step S104, the adder 164 adds the corrected texture component supplied from the amplifier 163 to the smoothed image supplied from the non-linear type filter 161 and outputs the output image obtained as a result.

The output image obtained in this manner is an image obtained by adjusting the sharpness and the contrast of the input image for each region. When the texture component is appropriately emphasized without changing the edge components of the input image, the sharpness and the contrast of the input image are adjusted.

When the output image is output from the adder 164, the adjustment process is finished, whereby step S17 of FIG. 3 is also finished and the image process is finished.

As mentioned above, the image processing unit 27 performs adjustment of the sharpness and contrast of each region by amplifying the texture component of the input image based on the control signal. When such a control signal is used, it is possible to perform preferable control of the sharpness and contrast with a stereoscopic effect for each region.

Furthermore, description was given that, in the image processing unit 27 of FIG. 10, the corrected texture component is added to the smoothed image and set as the output image; however, it may be that the corrected texture component is added to the input image and set as the output image.

Fourth Embodiment

Configuration Example of an Image Processing Unit

In addition, description was given that, in the image processing unit 27 of FIG. 10, adjustment of the sharpness and contrast is performed with respect to the texture component; however, it may be that the sharpness adjustment is also performed with respect to the edge component.

Figure 12:
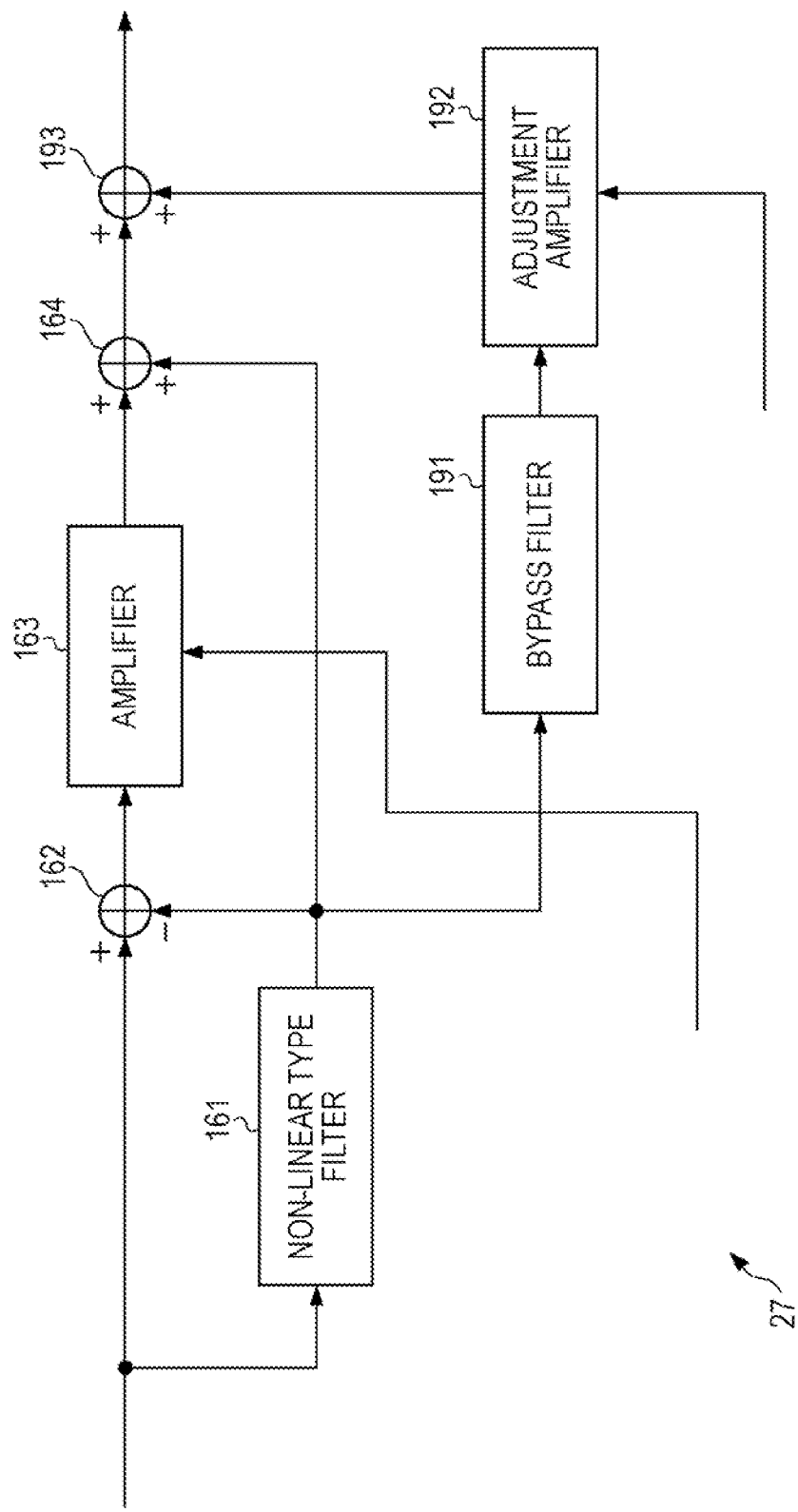
FIG. 12 is a diagram showing a configuration example of an image processing unit.

In such a case, the image processing unit 11 of the image processing unit 27 is configured as shown in FIG. 12, for example. In addition, in FIG. 12, the same reference numerals are given to the portions corresponding to the case of FIG. 10 and description thereof will be omitted.

That is, the image processing unit 27 is configured of the non-linear type filter 161, the subtraction unit 162, the amplifier 163, the adder 164, the high-pass filter 191, the adjustment amplifier 192 and the adder 193. That is, the image processing unit 27 of FIG. 12 is configured such that the image processing unit 27 of FIG. 10 is further provided with the components from the high-pass filter 191 to the adder 193.

The high-pass filter 191 performs a filter process using a high-pass filter with respect to the smoothed input image supplied from the non-linear type filter 161, and supplies the edge component obtained as a result to the adjustment amplifier 192.

The adjustment amplifier 192 amplifies or attenuates the edge component supplied from the high-pass filter 191 for each region of the input image based on the control signal supplied from the control signal synthesis unit 26, and performs supply thereof to the adder 193. Here, the control signal supplied to the adjustment amplifier 192 is generated using a different weighting to the weighting used in the generation of the control signal supplied to the amplifier 163.

Below, the edge components of the input image amplified or attenuated in the adjustment amplifier 192 may also be referred to as corrected edge components as appropriate.

The adder 193 adds the corrected edge component supplied from the adjustment amplifier 192 to the image supplied from the adder 164, and outputs the output image obtained as a result.

[Description of the Adjustment Process]

In a case where the image processing unit 27 is configured as shown in FIG. 12, the image process described with reference to FIG. 3 is performed by the image processing apparatus 11; however, in step S16, the control signal synthesis unit 26 generates two different control signals and respectively supplies the signals to the amplifier 163 and the adjustment amplifier 192.

In other words, the control signal synthesis unit 26 generates a control signal by weighting and adding a depth control signal, a face skin region control signal, and a person region control signal according to a predetermined weighting, and performs supply thereof to the amplifier 163. Further, the control signal synthesis unit 26 generates a control signal by weighting and adding a depth control signal, a face skin region control signal, and a person region control signal according to a different weighting to the above-described predetermined weighting, and performs supply thereof to the adjustment amplifier 192.

Further, in step S17 of the adjustment process in such an image process, the texture component and the edge component of the input image are respectively amplified or attenuated, and the sharpness and the contrast adjustment are performed.

Figure 13:
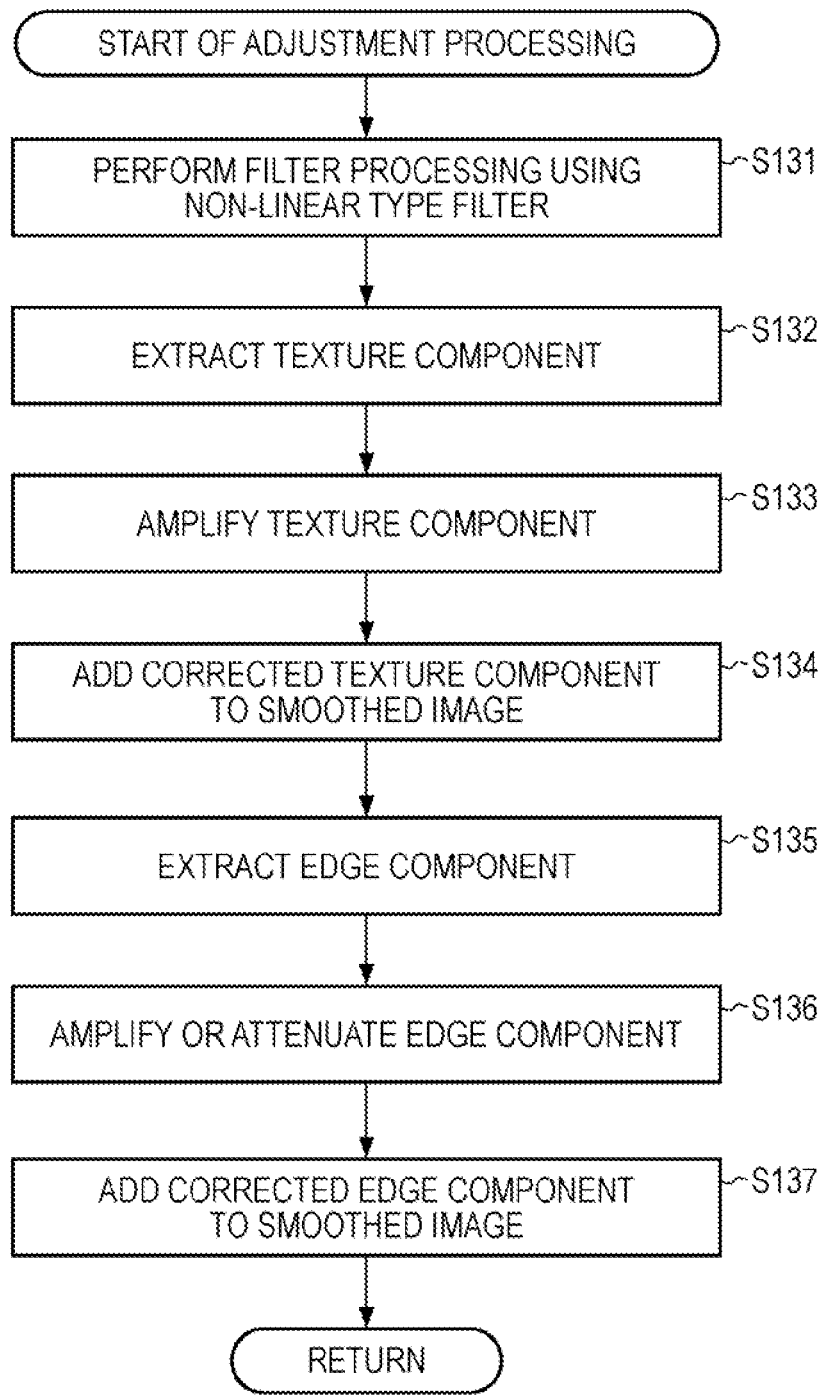
FIG. 13 is a flowchart describing an adjustment process.

Below, with reference to the flowchart in FIG. 13, description is given regarding the adjustment process performed using the image processing unit 27 of FIG. 12. The adjustment process corresponds to step S17 of FIG. 3.

Figure 11:
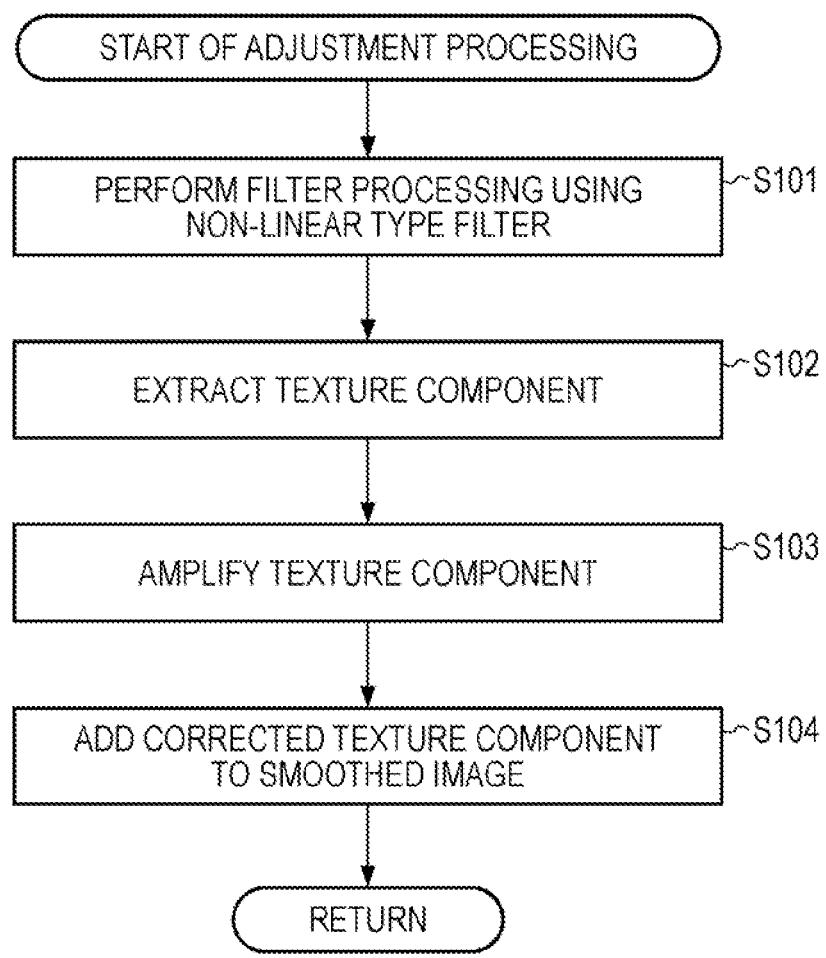
FIG. 11 is a flowchart describing an adjustment process.

Since the processes of step S131 to step S134 are the same as the process of step S101 to step S104 of FIG. 11, description thereof will be omitted.

However, in step S131, the non-linear type filter 161 supplies the smoothed image obtained by the filter process to the subtraction unit 162, the adder 164, and the high-pass filter 191. Further, in step S134, the adder 164 adds the corrected texture component from the amplifier 163 to the smoothed image from the non-linear type filter 161, and supplies the obtained image to the adder 193.

In step S135, the high-pass filter 191 performs a filter process using a high-pass filter with respect to the smoothed input image supplied from the non-linear type filter 161, and extracts the edge component of the input image. The high-pass filter 191 supplies the extracted edge component to the adjustment amplifier 192.

In step S136, the adjustment amplifier 192 amplifies or attenuates the edge component from the high-pass filter 191 for each region of the input image based on the control signal from the control signal synthesis unit 26, and performs supply thereof to the adder 193. That is, the pixel values of the pixels of the control image are added with respect to the pixel values of each pixel of the image of the edge components based on the control signal, and set as the corrected edge component.

In step S137, the adder 193 adds the corrected edge component supplied from the adjustment amplifier 192 to the smoothed image which is supplied from the adder 164 and to which the corrected texture component is added, and outputs the output image obtained as a result. When the output image from the adder 193 is output, the adjustment process is finished, whereby step S17 of FIG. 3 is also finished and the image process is finished.

In this manner, by adjusting not only the texture component of the input image but also the sharpness of the edge components of each region independently of the texture component, it is possible to perform more appropriate emphasis control of the edge and it is possible to obtain a preferable output image with a stereoscopic effect.

Fifth Embodiment

Configuration Example of an Image Processing Unit

In addition, in the image processing unit 27, super-resolution processing is performed and the input image is converted to an output image with a high resolution. At this point, the degree of the super-resolution effect in each region according to the control signal, in other words, the state of the super-resolution effect, may be adaptively controlled.

Figure 14:
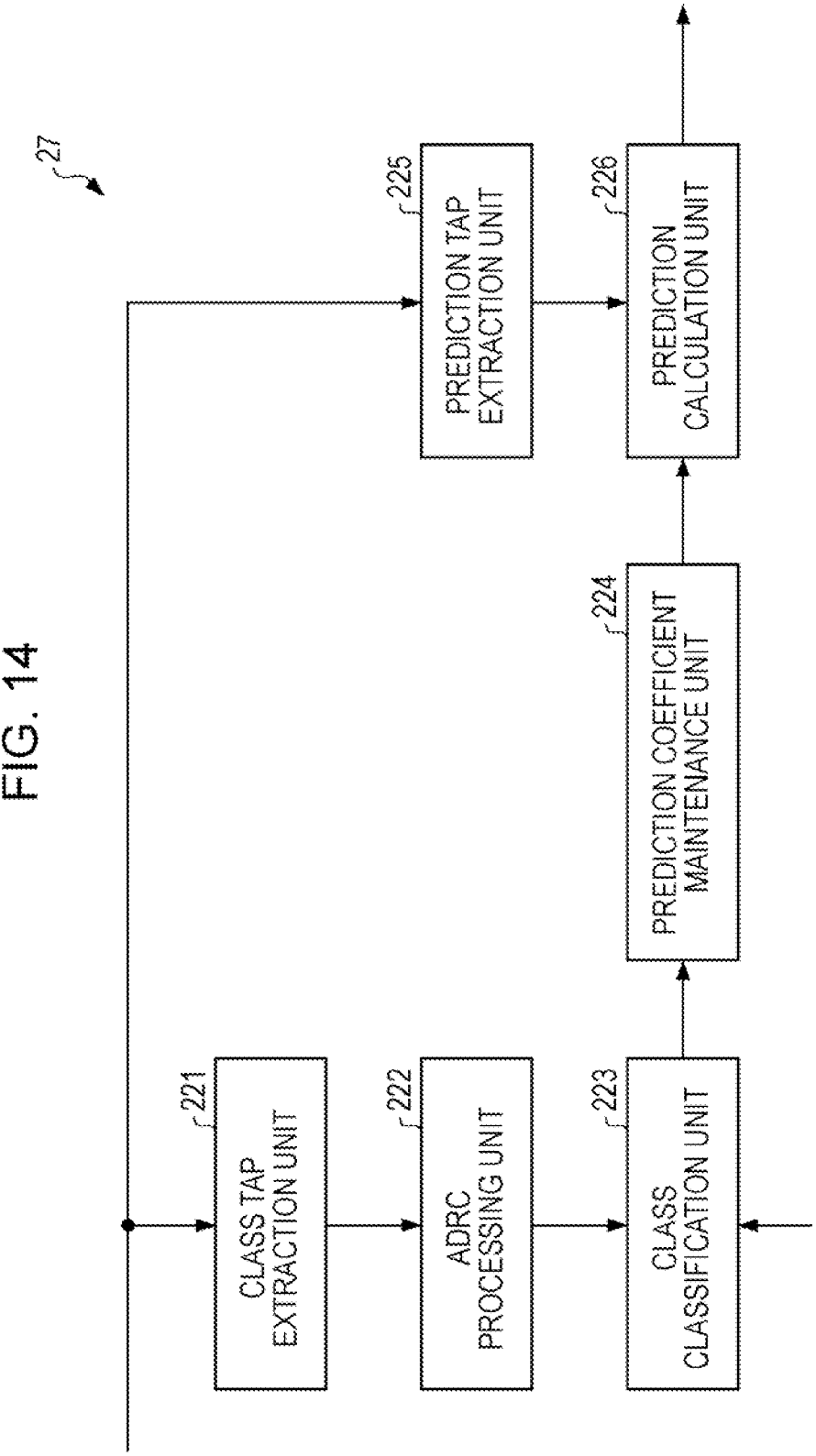
FIG. 14 is a diagram showing a configuration example of an image processing unit.

In such a case, the image processing unit 27 of the image processing apparatus 11 of FIG. 1, for example, is configured as shown in FIG. 14.

That is, the image processing unit 27 of FIG. 14 is configured of a class tap extraction unit 221, an ADRC (Adaptive Dynamic Range Control) processing unit 222, a class classification unit 223, a prediction coefficient maintenance unit 224, a prediction tap extraction unit 225, and a prediction calculation unit 226. In the image processing unit 27, the input image is supplied to the class tap extraction unit 221 and the prediction tap extraction unit 225.

The class tap extraction unit 221 sequentially sets the pixels of the output image to be generated from this point (the output image is an image to be calculated from this point, and, since it does not exist at the present stage, it is virtually assumed) as pixels of interest attracting attention. The class tap extraction unit 221 extracts several pixels in the vicinity of the same position as the pixels of interest in the supplied input image as a class tap for classifying the pixels of interest among one of the plurality of classes, and performs supply thereof to the ADRC processing unit 222.

The ADRC processing unit 222 performs ADRC processing on the class tap supplied from the class tap extraction unit 221, and supplies the class tap on which the ADRC processing has been performed to the class classification unit 223.

The class classification unit 223 classifies the class of the pixels of interest based on the class tap supplied from the ADRC processing unit 222, as a result, generates a class code showing the classified class of the pixels of interest. Further, the class classification unit 223 generates a prediction coefficient set ID showing which prediction coefficient set is used among the prediction coefficient sets made up of a plurality of prediction coefficients recorded in the prediction coefficient maintenance unit 224 based on the control signal supplied from the control signal synthesis unit 26.

In other words, in the prediction coefficient storage unit 224, a plurality of prediction coefficient sets made up of prediction coefficients for each class code are recorded. The prediction coefficients are used to predict the pixels of interest and are calculated in advance by studies. Further, when the prediction coefficient configures a different prediction coefficient set even for prediction coefficients of the same class code, the values of the prediction coefficients are different and it is possible to obtain pixels of interest for which the degree of the super-resolution effect and the feel, such as the sharpness, are different for each prediction coefficient set, for example.

The class classification unit 223 supplies a class code and a prediction coefficient set ID specifying a prediction coefficient set to the prediction coefficient maintenance unit 224. The prediction coefficient maintenance unit 224 supplies the prediction coefficient specified according to the class code and prediction coefficient set ID supplied from the class classification unit 223 to the prediction calculation unit 226.

The prediction tap extraction unit 225 extracts several pixels in the vicinity of the same position as the pixels of interest in the supplied input image as a prediction tap used for predicting pixel values of the pixels of interest, and performs supply thereof to the prediction calculation unit 226. The prediction calculation unit 226 multiplies the prediction coefficient supplied from the prediction coefficient maintenance unit 224 by the prediction tap supplied from the prediction tap extraction unit 225, in other words, the pixel values of the pixels configuring the prediction tap, performs prediction calculation of the pixel values of the pixels of interest, and generates an output image. The prediction calculation unit 226 outputs the generated output image.

[Description of the Adjustment Process]

Incidentally, even in a case where the image processing unit 27 is configured as shown in FIG. 14, the image processing described with reference to FIG. 3 is performed by the image processing apparatus 11. Further, in the adjustment processing of step S17 of the image processing, the input image is converted to an output image with a higher resolution than the input image.

Figure 15:
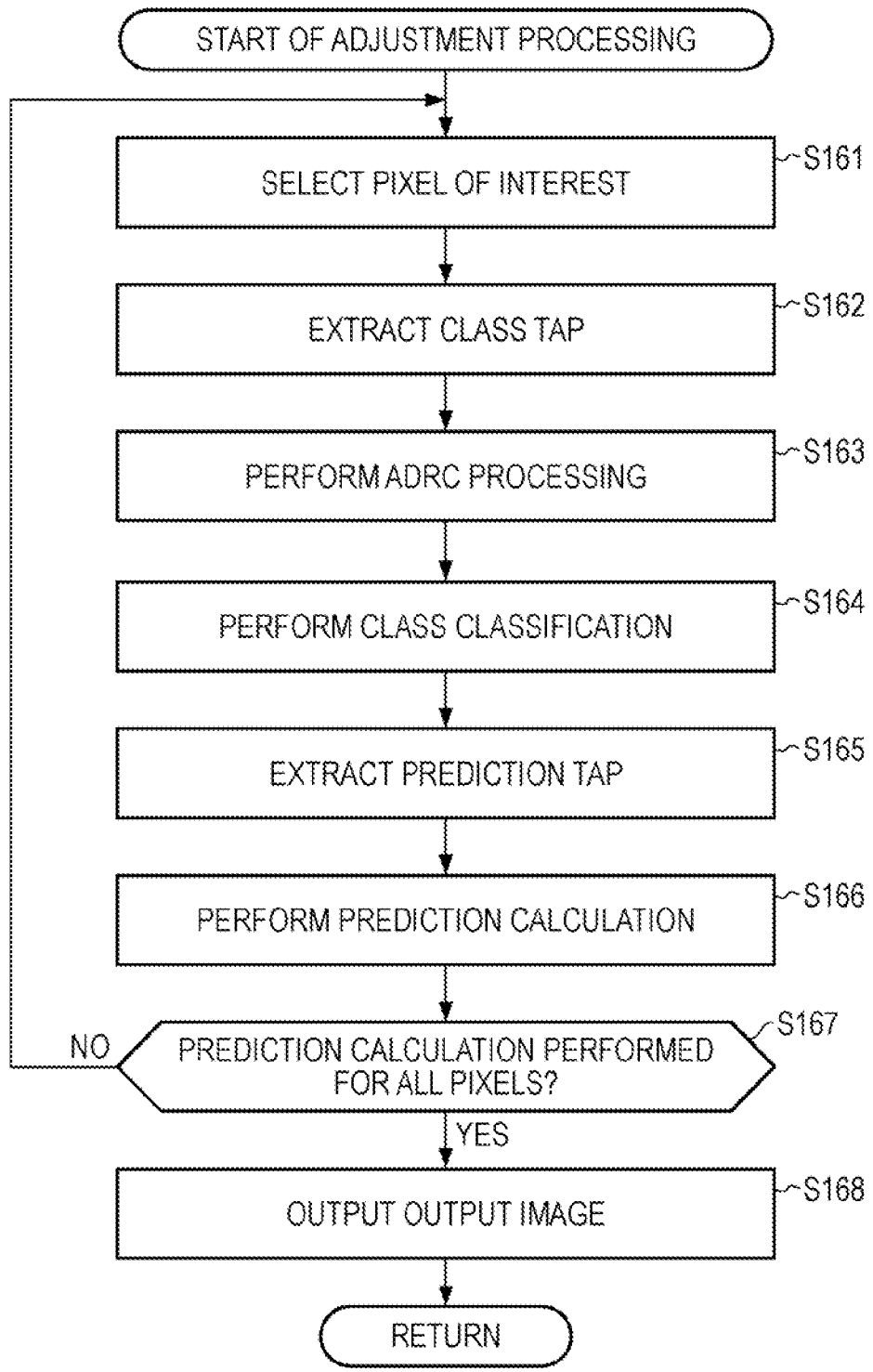
FIG. 15 is a flowchart describing an adjustment process.

Below, with reference to the flowchart in FIG. 15, description is given of the adjustment process performed by the image processing unit 27 of FIG. 14. The adjustment process corresponds to step S17 of FIG. 3.

In step S161, the image processing unit 27 selects one of the pixels of the output image which is to be generated from this point, and sets the pixel as a pixel of interest.

In step S162, the class tap extraction unit 221 extracts the class tap from the supplied input image, and performs supply thereof to the ADRC processing unit 222.

In step S163, the ADRC processing unit 222 performs ADRC processing on the class tap supplied from the class tap extraction unit 221, and performs supply thereof to the class classification unit 223.

For example, the ADRC processing unit 222 detects the maximum value MAX and the minimum value MIN of the pixel values of pixels configuring the class tap and sets the difference DR between the maximum value MAX and the minimum value MIN of the detected pixel values as the local dynamic range of the group of pixels configuring the class tap.

The ADRC processing unit 222 performs 1-bit re-quantization on the (pixel values of the) pixels configuring the class tap based on the dynamic range DR. That is, the ADRC processing unit 222 subtracts the minimum value MIN from the pixel values of each pixel configuring the class tap, and divides the subtracted value by DR/2 (quantization). Then, the ADRC processing unit 222 supplies the bit stream in which the pixel values of each pixel of 1 bit configuring the class tap obtained in the above manner are arranged in a predetermined order to the class classification unit 223.

In step S164, the class classification unit 223 performs class classification of the pixels of interest based on the bit stream supplied from the ADRC processing unit 222. For example, the class classification unit 223 sets the bit stream supplied from the ADRC processing unit 222 as the class code as is.

In addition, the class classification unit 223 selects a prediction coefficient set ID based on the pixel values of the pixels in the vicinity of the same position as the pixels of interest among the pixels of the control image based on the control signal supplied from the control signal synthesis unit 26. For example, the range in which the pixel values of the pixels of the control image are obtained is divided into several ranges, and a prediction coefficient set ID is associated with each of the divided ranges. The class classification unit 223 selects a prediction coefficient set ID associated with the range to which the pixel values of the pixels shown by the control signal belong.

The class classification unit 223 supplies the prediction coefficient set ID selected in this manner and the class code to the prediction coefficient maintenance unit 224. Thus, the prediction coefficient maintenance unit 224 supplies a prediction coefficient specified by the prediction coefficient set ID and the class code from the class classification unit 223 among the prediction coefficients of each prediction coefficient set recorded in advance to the prediction calculation unit 226. That is, the prediction coefficient specified by the class code among the prediction coefficients belonging to the prediction coefficient set specified by the prediction coefficient set ID is selected and output.

In step S165, the prediction tap extraction unit 225 extracts several pixels in the vicinity of the same position as the pixels of interest in the supplied input image as a prediction tap, and performs supply thereof to the prediction calculation unit 225.

In step S166, the prediction calculation unit 226 multiplies the prediction coefficient supplied from the prediction coefficient maintenance unit 224 by the pixel values of the pixels of the prediction tap supplied from the prediction tap extraction unit 225, and performs prediction calculation on the pixel values of the pixels of interest. That is, the sum of the pixel values multiplied by the prediction coefficient is set as the pixel value of the pixel of interest.

In step S167, the image processing unit 27 determines whether or not prediction calculation is performed regarding all the pixels of the output image. For example, in a case where all the pixels of the output image are set as pixels of interest and the pixel values thereof are calculated, it is determined that prediction calculation is performed with respect to all the pixels.

In step S167, in a case where it is determined that prediction calculation has not been performed yet for all the pixels, the process returns to step S161 and the above process is repeated.

On the other hand, in step S167, in a case where it is determined that prediction calculation is performed for all the pixels, the process proceeds to step S168.

In step S168, the prediction calculation unit 226 outputs an output image made up of pixel values of each pixel set as a pixel of interest, thereby finishing the adjustment process. When the adjustment process is finished, step S17 of FIG. 3 is also finished and the image process is finished.

In this manner, since the prediction coefficient set is selected based on the control signal in each region of the output image in the image processing unit 27, it is possible to adjust the degree of the super-resolution effect, that is, the degree of resolution creation for each region, and it is possible to obtain a preferable output image with a stereoscopic effect.

Sixth Embodiment

Configuration Example of an Image Processing Unit

Further, it is possible to adjust the chroma of the input image according to the control signal. In such a case, the image processing unit 27 of the image processing apparatus 11 of FIG. 1 is configured as shown in FIG. 16, for example.

Figure 16:
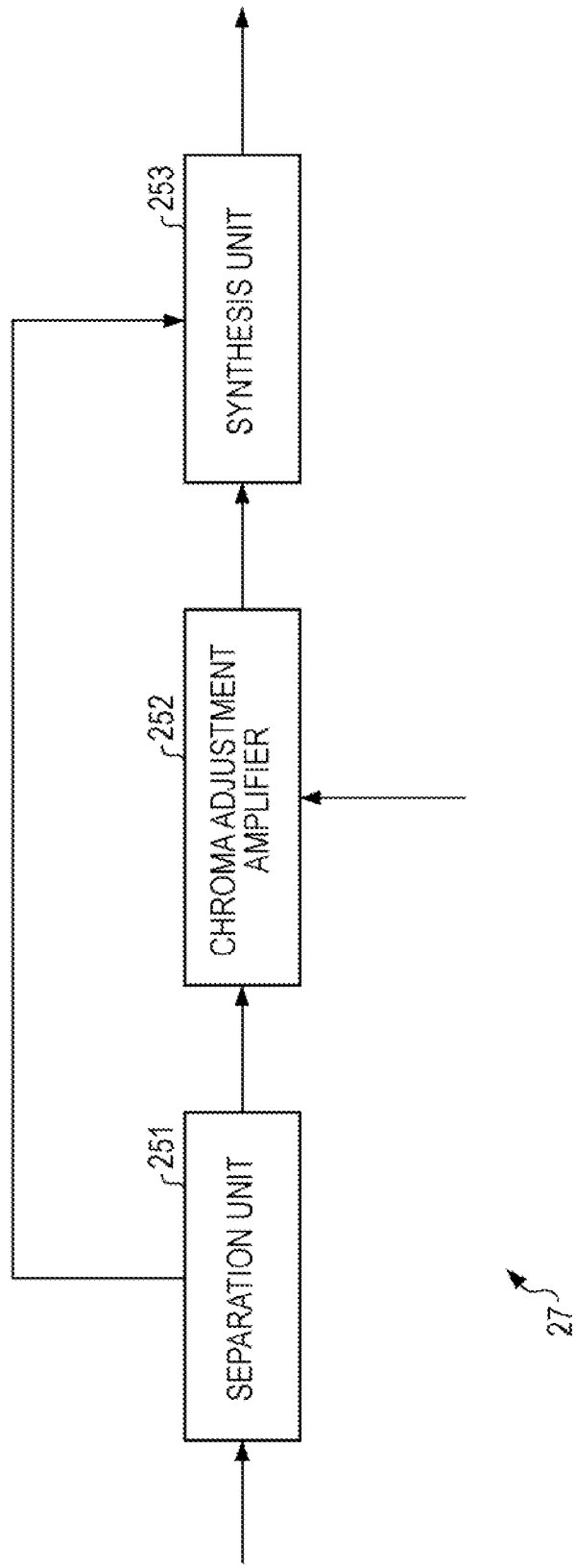
FIG. 16 is a diagram showing a configuration example of an image processing unit.

That is, the image processing unit 27 in FIG. 16 is configured of a separation unit. 251, a chroma adjustment amplifier 252, and a synthesis unit 253. In this example, the image signal of the input image is made up of a brightness signal (Y signal) and a chroma signal (CbCr signal).

The separation unit 251 separates the supplied input image into a brightness component (brightness signal) and a chroma component (chroma signal) and supplies the brightness component to the synthesis unit 253 as well as supplying the chroma component to the chroma adjustment amplifier 252.

The chroma adjustment amplifier 252 amplifies or attenuates the chroma component (color difference component) supplied from the separation unit 251 for each region of the input image based on the control signal supplied from the control signal synthesis unit 26, and performs supply thereof to the synthesis unit 253. The synthesis unit 253 outputs an image made up of the brightness component from the separation unit 251 and the chroma component from the chroma adjustment amplifier 252 as an output image.

[Description of the Adjustment Process]

Incidentally, even in a case where the image processing unit 27 is configured as shown in FIG. 16, the image processing described with reference to FIG. 3 is performed by the image processing apparatus 11. Further, in the adjustment processing of step S17 of the image processing, the adjustment of the chroma component of the input image is performed.

Figure 17:
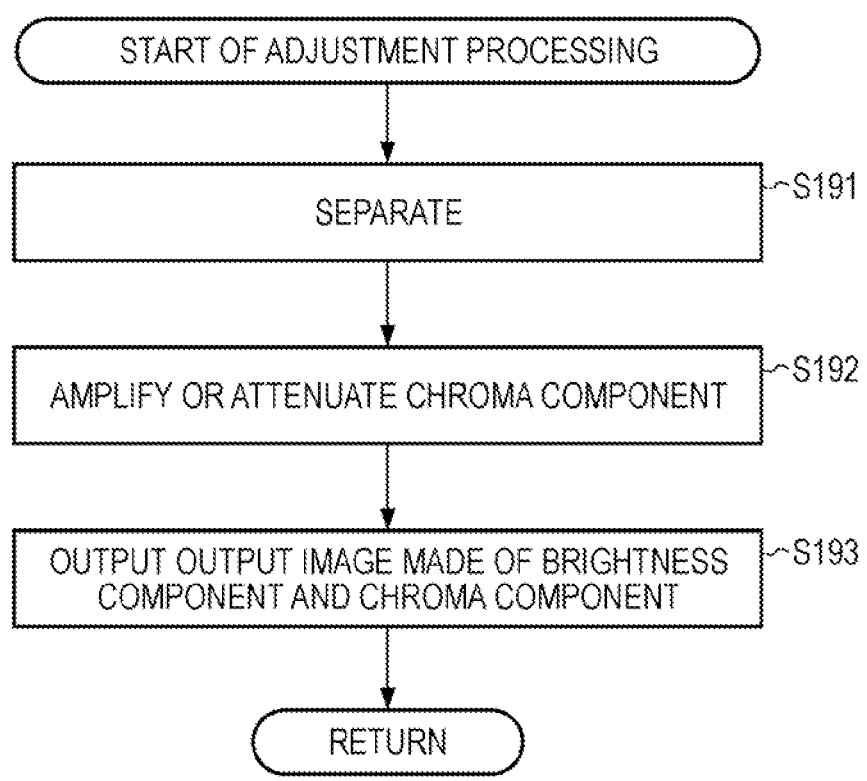
FIG. 17 is a flowchart describing an adjustment process.

Below, with reference to the flowchart in FIG. 17, description is given of the adjustment process performed by the image processing unit 27 of FIG. 16. The adjustment process corresponds to step S17 of FIG. 3.

In step S191, the separation unit 251 separates the supplied input image into a brightness component and a chroma component and supplies the brightness component to the synthesis unit 253 as well as supplying the chroma component to the chroma adjustment amplifier 252.

In step S192, the chroma adjustment amplifier 252 amplifies or attenuates the chroma component supplied from the separation unit 251 for each region of the input image based on the control signal supplied from the control signal synthesis unit 26, and performs supply thereof to the synthesis unit 253. For example, with respect to the pixel values of each pixel of the image of the chroma component, the pixel values of the pixels of the control image in the same position as the pixels are added and set as the corrected chroma component.

In step S193, the synthesis unit 253 outputs an image signal made up of the brightness signal of the brightness component from the separation unit 251 and the chroma signal of the chroma component from the chroma adjustment amplifier 252 as an image signal of an output image.

The output image obtained in this manner is obtained by adjusting the chroma of the input image for each region. When the output image is output from the synthesis unit 253, the adjustment process is finished, whereby step S17 of FIG. 3 is also finished and the image process is finished.

As mentioned above, the image processing unit 27 performs adjustment of the chroma of each region by amplifying or attenuating the chroma component of the input image based on the control signal. When such a control signal is used, it is possible to perform preferable control of the chroma with a stereoscopic effect for each region.

The above-described series of processes may be executed by hardware or may be executed by software. In a case where the series of processes is executed by software, the program configuring the software may be installed from a program recording medium to a computer in which dedicated hardware is installed, a general-use personal computer capable of executing various types of function by installing various types of programs, or the like, for example.

Figure 18:
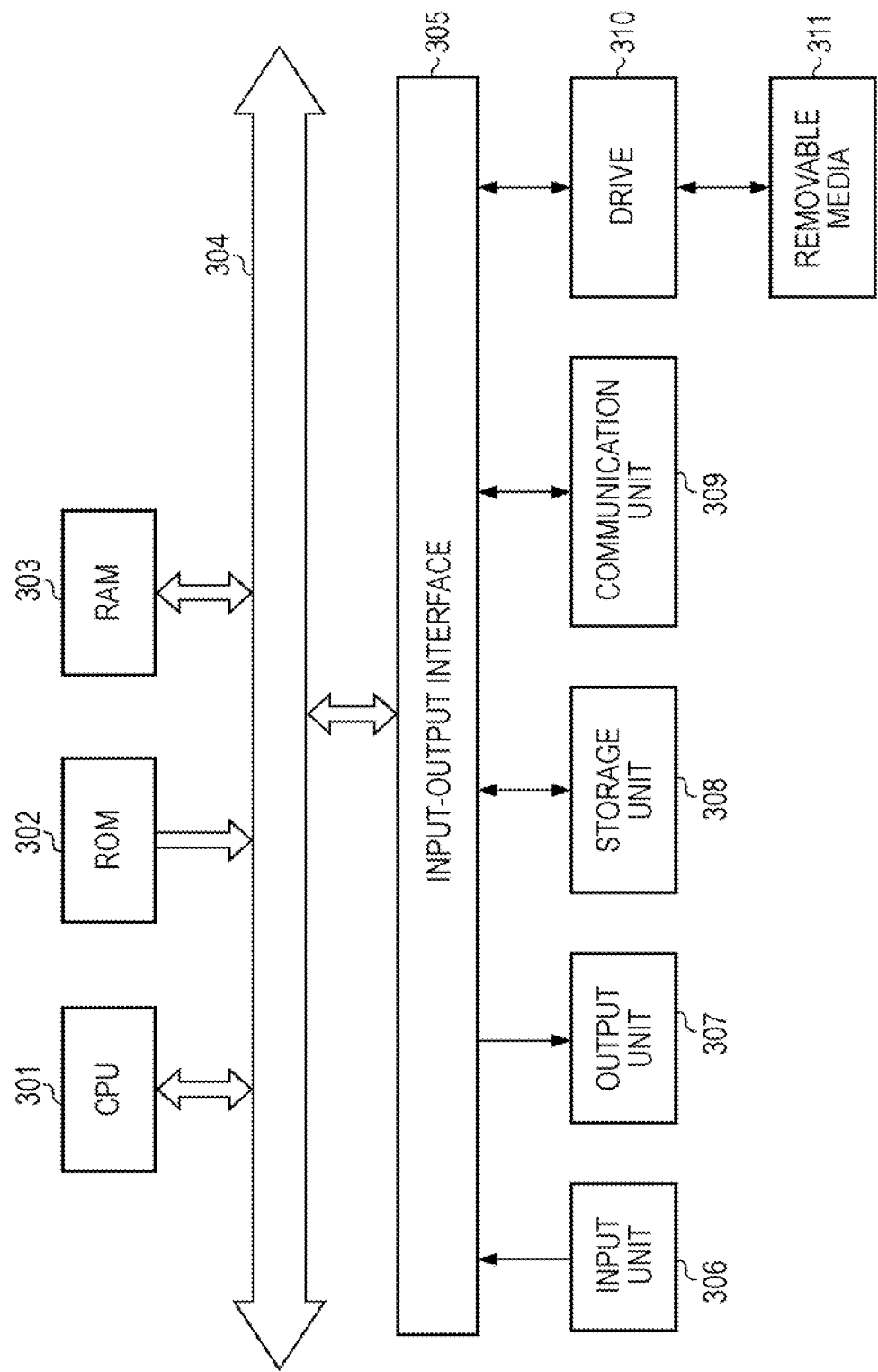
FIG. 18 is a diagram showing a configuration example of a computer.

FIG. 18 is a block diagram showing a configuration example of hardware of the computer performing the above-described series of processes according to a program.

In the computer, a CPU (Central Processing Unit) 301, a ROM (Read Only Memory) 302, and a RAM (Random Access Memory) 303 are mutually connected by a bus 304.

The bus 304 is further connected to an input output interface 305. The input output interface 305 is connected to an input unit 306 such as a keyboard, a mouse, or a microphone; an output unit 307 such as a display or a speaker; a recording unit 308 such as a hard disk or non-volatile memory; a communication unit 309 such as a network interface; and a drive 310 driving a removable medium 311 such as a magnetic disk, an optical disc, a magneto-optical disc, or a semiconductor memory.

In the computer configured as described above, the CPU 301, for example, performs the above-described series of processes by loading the program recorded in the recording unit 308 into the RAM 303 through the input output interface 305 and the bus 304 and executing the program.

The program executed by the computer (CPU301) is recorded on a removable media 311 which is a package media such as a magnetic disk (including a flexible disk), an optical disc (a CD-ROM (Compact Disc-Read Only Memory), a DVD (Digital Versatile Disc), or the like), a magneto-optical disc, or a semiconductor memory or the like, or shared through a wired or wireless transmission medium such as a Local Area Network, the Internet, or a digital satellite broadcast.

Here, it is possible to install the program in the recording unit 308 through the input output interface 305 by mounting the removable media 311 in the drive 310. In addition, it is possible to receive the program in the communication unit 309 through a wired or a wireless transmission medium and install the program in the recording unit 308. Furthermore, it is possible to install the program in advance in the ROM 302 and the recording unit 308.

In addition, the program executed by the computer may chronologically perform the processes in the sequence described in this specification, or may perform the processes in parallel or at appropriate timings such as when called.

Further, the embodiments of the present disclosure are not limited to the embodiments described above and various modifications are possible within a range not departing from the gist of the present disclosure.

Furthermore, the present disclosure may adopt the configuration below.

[1]

An image processing apparatus including: a depth control signal generation unit generating a depth control signal controlling the degree of emphasis of the feel of each region of an input image based on the depth position of a subject in each region of the input image; a face skin region control signal generation unit generating a face skin region control signal controlling the degree of emphasis of the feel of each region in the input image based on the skin of the face of the person in the input image; a person region control signal generation unit generating a person region control signal controlling the degree of emphasis of the feel of each region in the input image based on the region of the person in the input image; and a control signal synthesis unit synthesizing the depth control signal, the face skin region control signal, and the person region control signal to generate a control signal.

[2]

The image processing apparatus according to the above [1] further provided with an image processing unit adjusting the feel of each region of the input image and generating an output image, based on the control signal.

[3]

The image processing apparatus according to the above [2] in which the image processing unit amplifies or attenuates edge components of the input image based on the control signal.

[4]

The image processing apparatus according to the above [2] in which the image processing unit amplifies a texture component of the input image based on the control signal.

[5]

The image processing apparatus according to the above [4] in which the image processing unit amplifies or attenuates edge components of the input image based on a different control signal other than the control signal.

[6]

The image processing apparatus according to the above [2] in which the image processing unit is provided with a prediction coefficient selection unit selecting a prediction coefficient used in the generation of the output image based on the control signal for each region of the output image, and a prediction calculation unit generating an output image with a higher resolution than the input image based on the input image and the prediction coefficient.

[7]

The image processing apparatus according to the above [2] in which the image processing unit amplifies or attenuates the chroma component of the input image.

[8]

The image processing apparatus according to the above [1] or [2] further including an interest region control signal generation unit generating an interest region control signal controlling the degree of emphasis of the feel of each region in the input image based on the region estimated to be of high interest in the input image, in which the control signal synthesis unit synthesizes the depth control signal, the face skin region control signal, the person region control signal, and the interest region control signal, and generates a control signal.

[9]

The image processing apparatus according to any one of the above [1] to [8] in which the face skin region control signal generation unit specifies the human face skin region and generates the face skin region control signal based on the detection result of the human face region from the input image, and when the human face region is not detected from the input image of the process object, specifies the human face skin region in the input image of the process object based on the specific result of the human face skin region in a previous input image.

[10]

The image processing apparatus according to the above [9] in which the person region control signal generation unit specifies the region of the person in the input image and generates the person region control signal using at least one of the detection result of the human face region from the input image or the specific result of the human face skin region of the input image.

The present disclosure contains subject matter related to that disclosed in Japanese Priority Patent Application JP 2011-073042 filed in the Japan Patent Office on Mar. 29, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   a depth control signal generation unit generating a depth control signal controlling a degree of emphasis of a feel of each region of an input image based on a depth position of a subject in each region of the input image;
   a face skin region control signal generation unit generating a face skin region control signal controlling the degree of emphasis of the feel of each region in the input image based on a human face skin region in the input image;
   a person region control signal generation unit generating a person region control signal controlling the degree of emphasis of the feel of each region in the input image based on a region of a person in the input image; and
   a control signal synthesis unit synthesizing the depth control signal, the face skin region control signal, and the person region control signal to generate a control signal,
   wherein at least one of the depth control signal generation unit, the face skin region control signal generation unit, the person region control signal generation unit, and the control signal synthesis unit is implemented via a processor.

2. The image processing apparatus according to claim 1, further comprising an image processing unit adjusting the feel of each region of the input image and generating an output image, based on the control signal.

3. The image processing apparatus according to claim 2, wherein the image processing unit amplifies or attenuates edge components of the input image based on the control signal.

4. The image processing apparatus according to claim 2, wherein the image processing unit amplifies a texture component of the input image based on the control signal.

5. The image processing apparatus according to claim 4, wherein the image processing unit amplifies or attenuates edge components of the input image based on a control signal other than the control signal.

6. The image processing apparatus according to claim 2, wherein the image processing unit is provided with a prediction coefficient selection unit selecting a prediction coefficient used in generation of the output image based on the control signal for each region of the output image, and a prediction calculation unit generating an output image with a higher resolution than the input image based on the input image and the prediction coefficient.

7. The image processing apparatus according to claim 2, wherein the image processing unit amplifies or attenuates a chroma component of the input image, based on the control signal.

8. The image processing apparatus according to claim 1, further comprising an interest region control signal generation unit generating an interest region control signal controlling the degree of emphasis of the feel of each region in the input image based on a region estimated to be of high interest in the input image,
   wherein the control signal synthesis unit synthesizes the depth control signal, the face skin region control signal, the person region control signal, and the interest region control signal to generate a control signal.

9. The image processing apparatus according to claim 1, wherein the face skin region control signal generation unit specifies the human face skin region and generates the face skin region control signal based on the detection result of the human face region from the input image, and when the human face region is not detected from the input image, specifies the human face skin region in the input image based on the specific result of the human face skin region in a previous input image.

10. The image processing apparatus according to claim 9, wherein the person region control signal generation unit specifies the region of the person in the input image and generates the person region control signal using at least one of the detection result of the human face region from the input image or the specific result of the human face skin region of the input image.

11. An image processing method of an image processing apparatus comprising:
    a depth control signal generation unit generating a depth control signal controlling a degree of emphasis of a feel of each region of an input image based on a depth position of a subject in each region of the input image;
    a face skin region control signal generation unit generating a face skin region control signal controlling the degree of emphasis of the feel of each region in the input image based on a human face skin region in the input image;
    a person region control signal generation unit generating a person region control signal controlling the degree of emphasis of the feel of each region in the input image based on a region of a person in the input image; and
    a control signal synthesis unit synthesizing the depth control signal, the face skin region control signal, and the person region control signal to generate a control signal,
    wherein the depth control signal generation unit generates the depth control signal,
    wherein the face skin region control signal generation unit generates the face skin region control signal wherein the person region control signal generation unit generates the person region control signal, and wherein the control signal synthesis unit generates a control signal.

12. The image processing method according to claim 11, further comprising adjusting the feel of each region of the input image and generating an output image, based on the control signal.

13. The image processing method according to claim 12, further comprising amplifying or attenuating edge components of the input image based on the control signal.

14. The image processing method according to claim 12, further comprising amplifying a texture component of the input image based on the control signal.

15. The image processing method according to claim 14, further comprising amplifying or attenuating edge components of the input image based on a control signal other than the control signal.

16. The image processing method according to claim 12, further comprising selecting a prediction coefficient used in generation of the output image based on the control signal for each region of the output image, and generating an output image with a higher resolution than the input image based on the input image and the prediction coefficient.

17. The image processing method according to claim 12, further comprising amplifying or attenuating a chroma component of the input image, based on the control signal.

18. The image processing method according to claim 11, further comprising generating an interest region control signal controlling the degree of emphasis of the feel of each region in the input image based on a region estimated to be of high interest in the input image, wherein the depth control signal, the face skin region control signal, the person region control signal, and the interest region control signal are synthesized to generate a control signal.

19. The image processing method according to claim 11, wherein the face skin region control signal generation unit specifies the human face skin region and generates the face skin region control signal based on the detection result of the human face region from the input image, and when the human face region is not detected from the input image, specifies the human face skin region in the input image based on the specific result of the human face skin region in a previous input image.

20. The image processing method according to claim 19, wherein the person region control signal generation unit specifies the region of the person in the input image and generates the person region control signal using at least one of the detection result of the human face region from the input image or the specific result of the human face skin region of the input image.

21. A non-transitory computer-readable medium having embodied thereon a program, which when executed by a computer causes the computer to perform a method, the method comprising:

generating a depth control signal controlling a degree of emphasis of a feel of each region of an input image based on a depth position of a subject in each region of the input image;

generating a face skin region control signal controlling the degree of emphasis of the feel of each region in the input image based on a human face skin region in the input image;

generating a person region control signal controlling the degree of emphasis of the feel of each region in the input image based on a region of the person in the input image; and synthesizing the depth control signal, the face skin region control signal, and the person region control signal to generate a control signal.

* * * * *